(12) United States Patent
Ozeki et al.

(10) Patent No.: US 8,882,289 B2
(45) Date of Patent: Nov. 11, 2014

(54) LIGHTING DEVICE, LIGHTING UNIT, AND SUPPORT

(75) Inventors: Satoshi Ozeki, Anan (JP); Hiroshi Miyairi, Anan (JP); Masato Ono, Anan (JP)

(73) Assignee: Nichia Corporation, Anan-shi (JP)

( * ) Notice: Subject to any disclaimer, the term of this patent is extended or adjusted under 35 U.S.C. 154(b) by 1020 days.

(21) Appl. No.: 12/810,746

(22) PCT Filed: Dec. 26, 2008

(86) PCT No.: PCT/JP2008/073810
§ 371 (c)(1), (2), (4) Date: Jun. 25, 2010

(87) PCT Pub. No.: WO2009/084664
PCT Pub. Date: Jul. 9, 2009

(65) Prior Publication Data
US 2010/0271816 A1    Oct. 28, 2010

(30) Foreign Application Priority Data

Dec. 27, 2007  (JP) ................. 2007-336548
Dec. 27, 2007  (JP) ................. 2007-336549
Dec. 27, 2007  (JP) ................. 2007-336550

(51) Int. Cl.
*F21S 4/00*    (2006.01)
*F16M 11/10*   (2006.01)
(Continued)

(52) U.S. Cl.
CPC ........... *F21V 19/003* (2013.01); *F21Y 2101/02* (2013.01); *F21W 2131/405* (2013.01); *F16M 2200/022* (2013.01); *F21V 7/005* (2013.01); *F21S 4/008* (2013.01); *F16M 11/10* (2013.01); *F21V 13/02* (2013.01); *A47F 3/001* (2013.01); *F21V 29/004* (2013.01); *E05D 11/082* (2013.01); *F21V 29/2206* (2013.01); *F21Y 2103/003* (2013.01); *F21S 2/00* (2013.01)
USPC ..................................................... 362/217.05

(58) Field of Classification Search
USPC .......................... 362/217.01, 217.02, 217.05; 248/222.52
See application file for complete search history.

(56) References Cited

U.S. PATENT DOCUMENTS 2,303,156 A * 11/1942 Bryant et al. ............. 439/232
5,131,779 A     7/1992 Sen
(Continued)

FOREIGN PATENT DOCUMENTS

CN   2597736 Y    1/2004
DE   25 34 024 A1  2/1976
(Continued)

OTHER PUBLICATIONS

Japanese Notification of Reason for Refusal dated Jun. 29, 2012 (three (3) pages).

(Continued)

*Primary Examiner* — Anh Mai
*Assistant Examiner* — Zachary J Snyder
(74) *Attorney, Agent, or Firm* — Crowell & Moring LLP

(57) ABSTRACT

This aims to provide a support (10) comprising a bracket (7) attached to a predetermined structure, and a generally cylindrical holder (6) retained in the bracket (7). This bracket (7) has a receiving hole (112) for accommodating the holder (6). This holder (6) has a first rib (122) erected on a curved outer circumference, and an elastic portion (124) for giving the first rib (122) the degree of freedom for motions in the substantially radial direction. This also aims to provide a lighting unit (20) characterized by comprising a board (2), in which light emitting portions (23) having semiconductor light emitting devices are arrayed on the upper face side along the longitudinal direction, reflector members (3A and 3B) mounted on the side of the upper face of the board and having reflecting portions (34a and 34b) for covering the light emitting units and for reflecting the lights from the light emitting units, and a case member (4) disposed to support the board and the reflector members upward and downward.

7 Claims, 14 Drawing Sheets

(51) Int. Cl.
   *A47F 3/00* (2006.01)
   *E05D 11/08* (2006.01)
   *F21V 19/00* (2006.01)
   *F21Y 101/02* (2006.01)
   *F21W 131/405* (2006.01)
   *F21V 7/00* (2006.01)
   *F21V 13/02* (2006.01)
   *F21V 29/00* (2006.01)
   *F21Y 103/00* (2006.01)
   *F21S 2/00* (2006.01)

(56) References Cited

U.S. PATENT DOCUMENTS

| | | | |
|---|---|---|---|
| 5,943,738 | A | 8/1999 | Karfiol |
| 2002/0006039 | A1 | 1/2002 | Ueda et al. |

FOREIGN PATENT DOCUMENTS

| | | | |
|---|---|---|---|
| DE | 94 19 315 U1 | | 3/1995 |
| DE | 10 2006 010 020 A1 | | 9/2007 |
| GB | 1037237 A | | 7/1966 |
| JP | 49-23647 U | | 2/1974 |
| JP | 60-19824 U | | 2/1985 |
| JP | 61-56712 U | | 4/1986 |
| JP | 63-153411 U | | 10/1988 |
| JP | 6-68218 U | | 9/1994 |
| JP | 10-184660 A | | 7/1998 |
| JP | 11-25732 A | | 1/1999 |
| JP | 2000-257624 A | | 9/2000 |
| JP | 2002-93227 A | | 3/2002 |
| JP | 2002-299697 A | | 10/2002 |
| JP | 2003-16830 A | | 1/2003 |
| JP | 2005-108544 A | | 4/2005 |
| JP | 2006-116197 A | | 4/2005 |
| JP | 2006-12860 A | | 1/2006 |
| JP | 2006-83897 A | | 3/2006 |

OTHER PUBLICATIONS

Japanese Notification of Reason for Refusal dated Jun. 26, 2012 (two (2) pages).
Japanese Notification of Reason for Refusal dated Jun. 26, 2012 (four (4) pages).
International Search Report including English translation dated Feb. 3, 2009 (Five (5) pages).
Extended European Search Report dated Nov. 5, 2012 (eight (8) pages).

* cited by examiner

LIGHTING DEVICE, LIGHTING UNIT, AND SUPPORT

TECHNICAL FIELD

The present invention relates to a lighting device using a semiconductor light emitting device as a light source, and more particularly, to the lighting device used for illuminating goods which are displayed in a display case such as a showcase, and a lighting unit as well as a support used for the lighting device.

BACKGROUND ART

Conventionally, as an illumination light source used for illuminating goods displayed in a display case such as a showcase, a fluorescent light is used (see, for example, JPn. Pat. Appln. KOKAI Publication No. 2003-16830). The illumination light source in the patent application illuminates various kinds of goods displayed in, for example, a showcase, and has an important role for showing a commercial value of the product. In addition, the fluorescent light is used for not only the showcase but also, for example, general lighting (for example, room light and desk light), advertisement lighting, wall lighting, and a sidewalk light as the illumination light source.

On the other hand, recently, as a lighting unit to replace the fluorescent light, a line-shaped lighting unit using a semiconductor light emitting device such as a light emitting diode as a light source has been proposed. For example, the lighting unit which is provided with a plurality of LEDs (light emitting device) mounted along the longitudinal direction of a board and a transmissive resin portion having substantially a half-columnar shape, or a hog-backed shape has been proposed (see, for example, JPn. Pat. Appln. KOKAI Publication No. 2002-299697).

In addition, another lighting unit has been proposed (see, for example, claim 1 and FIG. 2 in JPn. Pat. Appln. KOKAI Publication No. 2005-108544), in which a board that arranges LEDs on the front surface and has wiring patterns for the LEDs on the front and back surfaces and a through-hole surrounded by the LEDs, is housed in a basket with a bottom so that the LEDs array is arranged in parallel with an opening face of the basket and a clearance is formed between an inner surface of the basket and the board, and the basket is exhausted from the bottom of the basket. In the lighting unit which integrally arranges a plurality of LEDs as described above, a temperature of the board on which the LEDs are arranged is raised due to the light emission of the LEDs. Therefore, a means for suppressing the temperature rise of the board is required. In the lighting unit which is disclosed in JPn. Pat. Appln. KOKAI Publication No. 2005-108544, the temperature rise of the board when the LEDs emit light is suppressed by air passing through the through-hole disposed on the board and air passing through the clearance between the inner surface of the basket and the board.

The semiconductor light emitting device such as the light emitting diode has many following advantages. The lifetime is long in comparison with a fluorescent light. The power consumption is low due to high energy efficiency. The handling is easy and robust because of a solid state device. An environmentally hazardous material, such as mercury is not contained. The optical control is easy since the light can be assumed as a point source which emits the light only to the front side (hemisphere) of the LED, thereby a light usage efficiency can be increased when the LED is used as a lamp. Accordingly, in the lighting unit using a semiconductor light emitting device as a light source, a maintenance cost and a running cost can be reduced due to, for example, a long time between the replacements of the light source and easiness of handling.

In addition, as a method for holding a conventional lighting unit at an arbitrary angle, the method which has a locking member to be fixed to a bracket and a fastening member to which the lighting unit is fixed has been proposed (see, for example, claim 1 and FIG. 5 in JPn. Pat. Appln. KOKAI Publication No. 2005-116197), in which the lighting unit is fixed by winding up the fastening member around the locking member to fasten up. In the method for fixing the lighting unit disclosed in the JPn. Pat. Appln. KOKAI Publication No. 2005-116197, more specifically, a cylindrical member is used for the locking member and the locking member is fixed to a frame of, for example, a display case to which the lighting unit is fixed. Therefore, the locking member does not rotate. The fastening member consists of a circular arc curved portion which substantially covers a whole circumferential curved surface of the locking member in the circumferential direction and two plate portions projected from an end of the curved portion. If the two plate portions are fastened each other by a screw, the curved portion fastens up the locking member. Then, the fastening member is fixed to the locking member and the lighting unit fixed to the fastening member is fixed to a predetermined position.

DISCLOSURE OF THE INVENTION

Problems to be Solved by the Invention

However, there are the following problems in a lighting device consisting of the conventional lighting unit and a support supporting the lighting unit.

A fixing work of the conventional lighting unit is troublesome in connecting and fixing the components because the conventional lighting unit uses a fixing component such as a screw. In addition, a fixing strength of each of the components is lowered during a long time usage after the assembly. Furthermore, for example, the screw may be unscrewed due to, for example, vibrations. Therefore, the conventional lighting unit could not extract advantages of the lighting unit using a semiconductor light emitting device as a light source, such as a long life time, a low power consumption, easy handling and robustness due to a solid state device, and increase in optical utilization efficiency.

In addition, in the lighting unit disclosed in the third patent literature JPn. Pat. Appln. KOKAI Publication No. 2005-108544, the air passing through the through-hole disposed in the board flows in a direction to the bottom side of the basket from the light irradiation surface by the LED. Then, the board is cooled by the air warmed up by the light from the LED. Therefore, there is a possibility that the temperature rise of the board can not sufficiently suppressed, especially in the center portion of the board, because the board is cooled by the air warmed by the light from the LED. In addition, since air introduced in the bottom portion of the basket from a periphery of the board flows into a direction perpendicular to the main surface of the board toward the bottom of the box, the air hardly flows around a backside (bottom side of the box) of the center portion of the board. Therefore, there is a possibility that the temperature rise of the board is not sufficiently suppressed.

In addition, in the method for fixing the lighting unit disclosed in the fourth patent literature JPn. Pat. Appln. KOKAI Publication No. 2005-116197, when an angle of the lighting unit is changed, a screw fastening the plate portion is loosened to adjust the angle of the lighting unit, and the plate portion is fastened again by the screw. Therefore, the workability is poor. Especially, if the locking member or the fastening member is disposed right under and close to the top board of a certain structure, the work is extremely troublesome.

Meanwhile, it may be supposed that the fastening member is rotatable and supportable against the locking member, by adjusting a force to fasten the fastening member by the locking member and utilizing a friction between the fastening member and the locking member. However, a setting of the fastening force of the fastening member with a screw depends on an individual force level of the setting operator of the lighting unit. Then, if the fastening force is too strong, the adjustment of the angle of the lighting unit becomes hard, and if the fastening force is too weak, the angle of the lighting unit may be changed with time from the original angle of the lighting unit.

It is, therefore, an object of the present invention to provide a lighting device and a support as well as a lighting unit constituting the lighting device. The lighting device consists of the lighting unit and the support which can be tightly assembled simply and easily without using a fixing component such as a screw. In addition, the lighting device can maintain fastening strength of the components for a long time after assembly, can uniformly dissipate a heat from a board which is provided with a plurality of light emitting devices, and is useful as an illumination light source for, for example, a showcase.

Means for Solving the Problems

The present invention has been developed for solving the above problems, and according to a first aspect of the present invention, there is provided a support which includes a bracket fixed to a predetermined structure and a holder locked to the bracket and having substantially a columnar shape. The bracket has a receiving hole for housing the holder. The holder has a first rib erected at a curved outer circumferential surface and an elastic portion which gives a freedom of motions to the first rib in substantially a radial direction. The first rib is pushed to an inner circumferential surface of the receiving hole by the elastic portion, and the holder is rotatable and lockable against the bracket by utilizing a frictional force to be generated between the first rib and the inner circumferential surface of the receiving hole.

According to the support described above, when a rotary body is held on the holder, an angle adjustment of the rotary body can be easily conducted by an external force larger than the frictional force generated between the first rib and the inner circumferential surface of the receiving hole, and the rotary body can also be held by the frictional force after the external force is removed. Strength of the frictional force can be determined by geometrical designs of the bracket and the holder. A structure of the support is simple and assembling of the support is easy.

According to a second aspect of the present invention, there is provided the support in which the first rib is disposed at least four places of two pairs which are substantially point symmetric with respect to a radial direction of the holder.

Due to the configuration described above, the holder can be held stably in the receiving hole without rattling.

According to a third aspect of the present invention, there is provided the support in which the receiving hole has a structure where a bottom diameter is smaller than an opening diameter and a protrusion is formed at a predetermined position on the inner circumferential surface which is formed in a conical shape, and the holder includes an annular groove formed in a circumferential direction at a central portion in the longitudinal direction on the curved outer circumferential surface, a first annular protrusion constituting one side wall of the annular groove and provided with a recess through which the protrusion can pass, and a second annular protrusion constituting the other side wall of the annular groove. When the holder is locked in the bracket, a frictional force is generated between a wall surface of the first annular protrusion on the side of the annular groove and the protrusion by utilizing a force that the first rib receives from the inner circumferential surface of the receiving hole in a direction pushing out the holder from the receiving hole.

Due to the configuration described above, strength of the frictional force for locking the holder in the receiving hole of the bracket can be increased. In addition, due to a key structure of the bracket and the holder, the holder can be prevented from dropping off from the bracket.

According to a fourth aspect of the present invention, there is provided the support which further includes a second rib erected on the wall surface of the first annular protrusion on the side of the annular groove.

Due to the configuration described above, when the holder is rotated within the receiving hole of the bracket, the rotation of the holder is braked by contact of the second rib with the protrusion disposed in the receiving hole of the bracket just before returning to the state when the holder is housed in (engaged with) the bracket, and the holder is hardly taken off from the bracket.

According to a fifth aspect of the present invention, there is provided the support in which the holder consists of two members having substantially half-columnar shapes identical to each other.

Due to the configuration described above, the holder is formed to be axial symmetry, and the holder is prevented from causing decentering and shifting of the axis by the clearances of the members. Namely, the decentering of the rotary body can be suppressed.

In order to solve the foregoing problems, according to a sixth aspect of the present invention, there is provided a lighting unit which includes a board on which a light emitting portion having a semiconductor light emitting device is arrayed on an upper side along the longitudinal direction, a reflector which is disposed on the upper side of the board and has a reflection portion inside the reflector for reflecting a light from the light emitting portion, as well as covering the light emitting portion, and a case disposed so as to support the board and the reflector from the top and the bottom.

According to a seventh aspect of the present invention, it is preferable that the reflector has an engagement click engaging with a front edge of the board.

In addition, according to an eighth aspect of the present invention, it is preferable that the case consists of an upper end edge supporting a backside of the reflector and a bottom surface which is disposed continuously to the upper end edge and supports a lower surface of the board.

Furthermore, according to a ninth aspect of the present invention, it is preferable that the upper end edge of the case has an engagement line groove formed along the longitudinal direction of the board, and the backside of the reflector has an engagement projected line portion to be engaged with the engagement line groove.

According to a tenth aspect of the present invention, it is preferable that the bottom surface of the case has a board support rib along a lateral direction of the board.

According to an eleventh aspect of the present invention, it is preferable that the lighting unit further includes a board holding end protrudingly disposed outward from both ends of the board in the longitudinal direction of the board, a case holding end protrudingly disposed outward from both ends of the case in the longitudinal direction of the case and to be overlapped with the board holding end, and a holder holding the board holding end and the case holding end which are overlapped to each other and being held rotatably.

In addition, according to a twelfth aspect of the present invention, it is preferable that a cover provided with a lower engagement portion engaging with the front edge of the board and an upper engagement portion engaging with the front edge of the reflector is mounted on a front opening portion located in a lighting direction of the board and the reflector.

According to a thirteenth aspect of the present invention, there is provided the lighting unit in which the case includes a bottom plate facing the other main surface of the board at a predetermined distance, and a board support rib erected on the bottom plate at predetermined intervals so as to be substantially in parallel with a lateral direction of the board and supporting the board. A space formed between the board and the bottom plate opens to a side of one long side and to a side of the other long side of the bottom plate along respective sides.

Due to the configuration described above, although air in the vicinity of the board is warmed when a temperature of the board is raised by the emission of the light emitting device, the warmed air is easily exhausted through a space formed between the board and a bottom plate of the case in the lateral direction of the board. Therefore, the heat can be dissipated homogeneously, and thereby a temperature of the whole board can be maintained homogeneously. In addition, if people try to adjust the arrangement of the lighting unit when a temperature of the board is high, the people are prevented from directly contacting the heated board 2 by the bottom plate of the case, thereby resulting in securing the safety. Furthermore, since the board is supported by a plurality of board support ribs, a generation of, for example, deflection of the board due to a change and inhomogeneity of the temperature of the board can be prevented, and good illumination condition of the light can be maintained.

According to a fourteenth aspect of the present invention, the reflector has a structure to reflect a light from the semiconductor light emitting device to substantially lateral direction of the board, and on a side opposite to the reflection direction of the light by the reflector, an edge of the bottom plate along the long side is located on a side of the reflection direction of the light by the reflector in comparison with an edge of the board along the long side thereof.

Due to the configuration described above, on the side opposite to the lighting direction of the light, an opening of the space formed between the board and the bottom plate of the case opens wide on the side of the bottom plate. Therefore, a good heat dissipation performance can be secured, even if the lighting unit is arranged close to a wall of, for example, the ceiling in such a manner that the light is illuminated in a direction substantially perpendicular to the wall.

According to a fifteenth aspect of the present invention, there is provided a lighting device provided with the support and the lighting unit to which the support is fixed.

In the lighting device, an angle of the lighting unit can be easily adjusted and maintained, and the lighting device has a good heat dissipation performance.

Effects of the Invention

According to the support of the present invention, the support has such a simple structure that the holder holding a rotary body is engaged with and locked to the bracket. Therefore, the assembling is extremely easy. In addition, since the support utilizes a frictional force between the holder and the bracket, an angle of the rotary body can be adjusted arbitrarily by rotating the rotary body with a force larger than the frictional force, and the rotary body can be maintained stably at the adjusted angle after the adjustment of the angle by the frictional force between the holder and the bracket. Accordingly, the lighting device provided with the support can easily adjust an illumination angle and can maintain the illumination angle stably.

According to the lighting unit of the present invention, it is possible to tightly assemble the board on which a semiconductor light emitting device is mounted, the reflector having a reflection portion for reflecting a light, the case, and the cover with ease and simpleness without using a fixing component such as a screw. In addition, a fixing strength of the constituents can be maintained for a long time after the assembling. Accordingly, the lighting device using the lighting unit of the present invention is useful as an illumination light source for a showcase, general lighting (for example, room light and desk light), advertisement lighting, wall lighting, and a sidewalk light.

According to the lighting unit of the present invention, a heat dissipation from a board provided with a plurality of light emitting devices can be conducted homogeneously and easily, and as a result, a temperature of the whole board can be maintained homogeneously. In addition, since people cannot touch a heated board, the safety can be secured. Furthermore, since a generation of, for example, a deflection due to a change and inhomogeneity of the temperature of the board is suppressed, a good illumination condition of the light can be maintained.

BEST MODE FOR CARRYING OUT THE INVENTION

Figure 1:
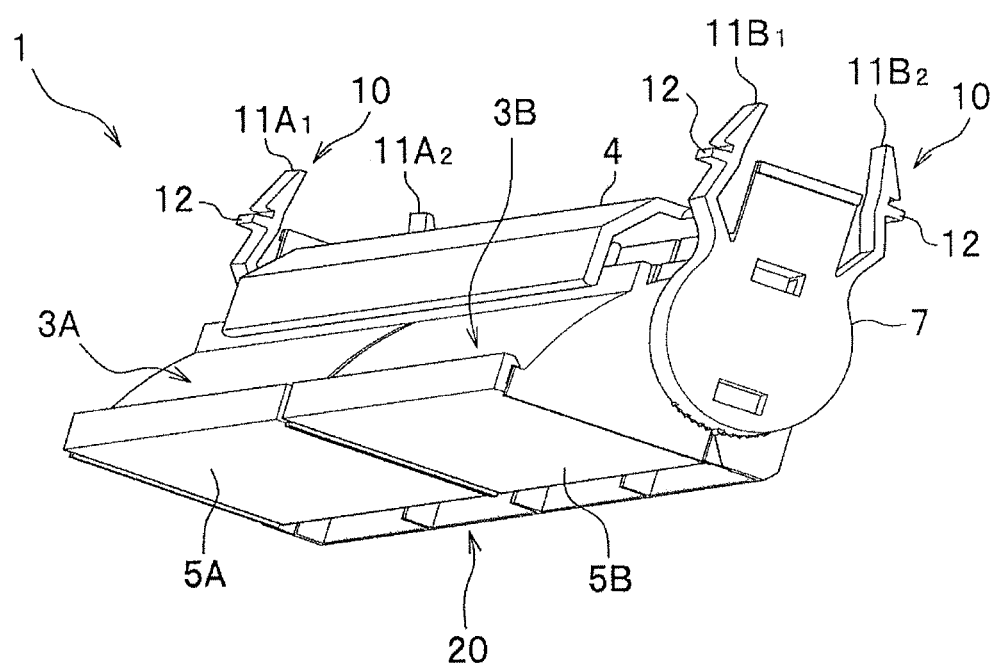
FIG. 1 is a perspective view showing an external appearance of a lighting device.

A schematic structure of a lighting device according to a best mode (hereinafter, referred to as "embodiment") for carrying out the present invention is shown in FIG. 1. A lighting device 1 consists of a lighting unit 20 and a support 10. The lighting unit 20 has a long rectangular shape and includes a circuit board 21, a heatsink board 22, reflector members 3A, 3B, a case member 4, and cover members 5A, 5B which cover opening faces of the reflector members 3A, 3B. Hereinafter, each of the support 10 and the lighting unit 20 constituting the lighting device 1 will be explained.
<<Support>>

Figure 2A:
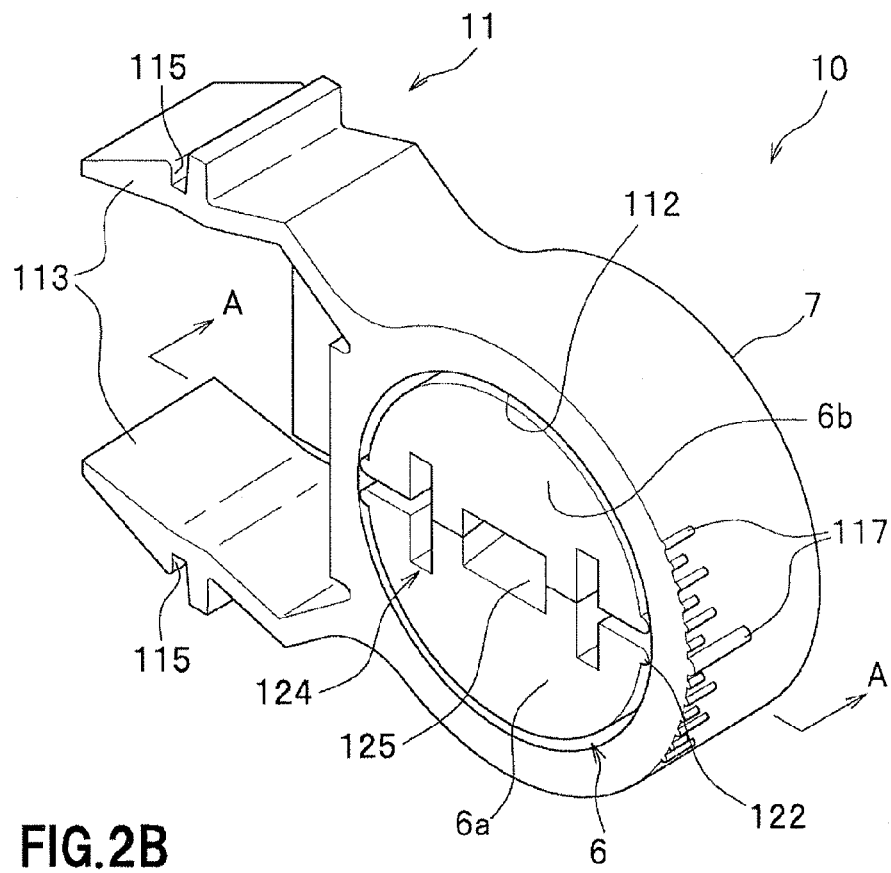
FIG. 2A is a perspective view showing a schematic structure of a support according to a first embodiment of the present invention.

A perspective view showing a schematic structure of a support according to a first embodiment of the present invention is shown in FIG. 2A. The support 10 consists of a bracket 7 to be fixed on a predetermined structure (not shown) and a substantially columnar holder 6 which is housed inside the bracket 7 and configured to be rotatable and lockable against the bracket 7. The bracket 7 is provided with a receiving hole portion 112 for housing the holder 6. The holder 6 includes a first rib 122 erected on an outer circumferential curved surface and an elastic portion 124 for giving the first rib 122 the degree of freedom of motions in substantially the radial direction, and further, the holder 6 is provided with a rotary body holding portion 125 for holding the rotary body (not shown). Meanwhile, FIG. 2A shows a status that the holder 6 is locked in the receiving hole portion 112 of the bracket 7. A procedure for locking the holder 6 to the bracket 7 will be explained later.

Figure 2B:
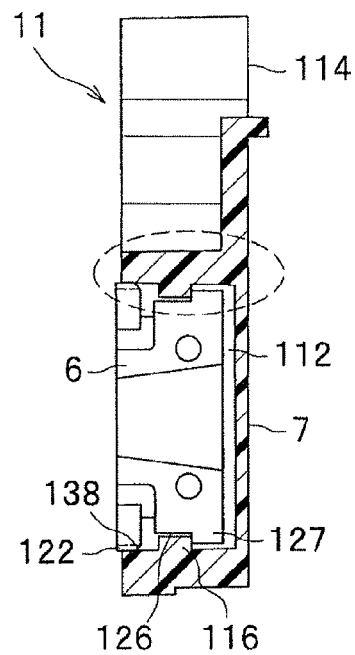
FIG. 2B is a cross sectional view of FIG. 2A taken along A-A line.
Figure 2C:
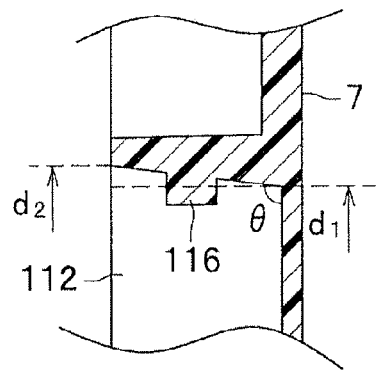
FIG. 2C is a partially enlarged view of FIG. 2B.
Figure 3A:
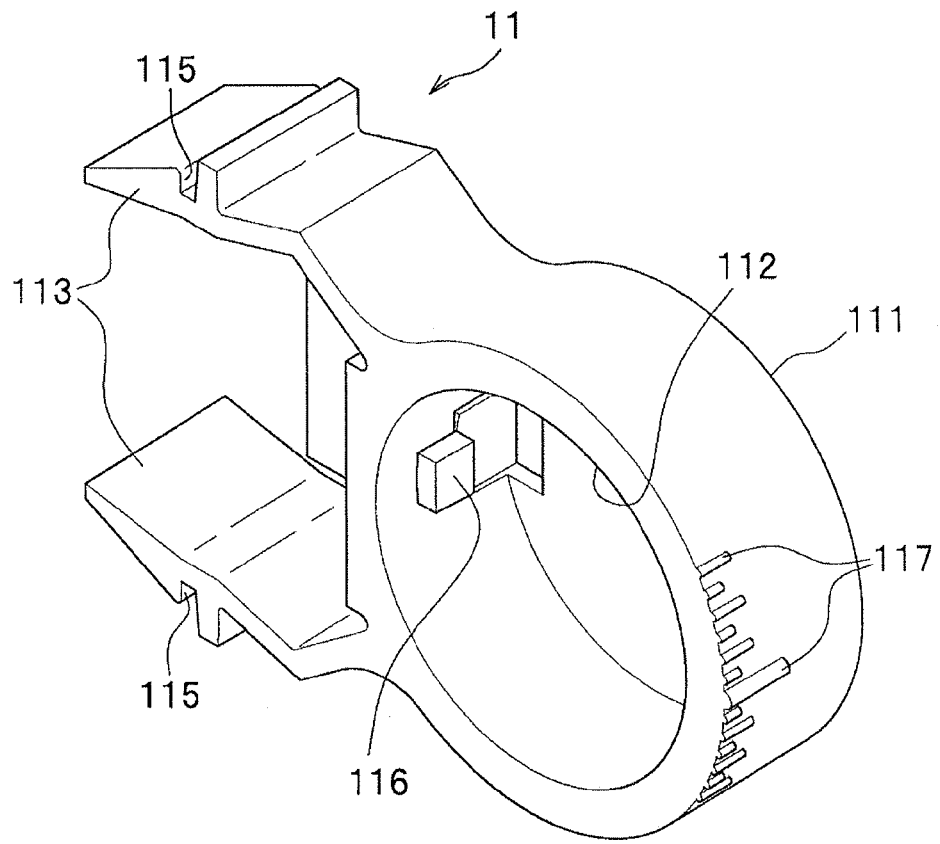
FIG. 3A is a perspective view showing a schematic structure of a bracket.
Figure 3B:
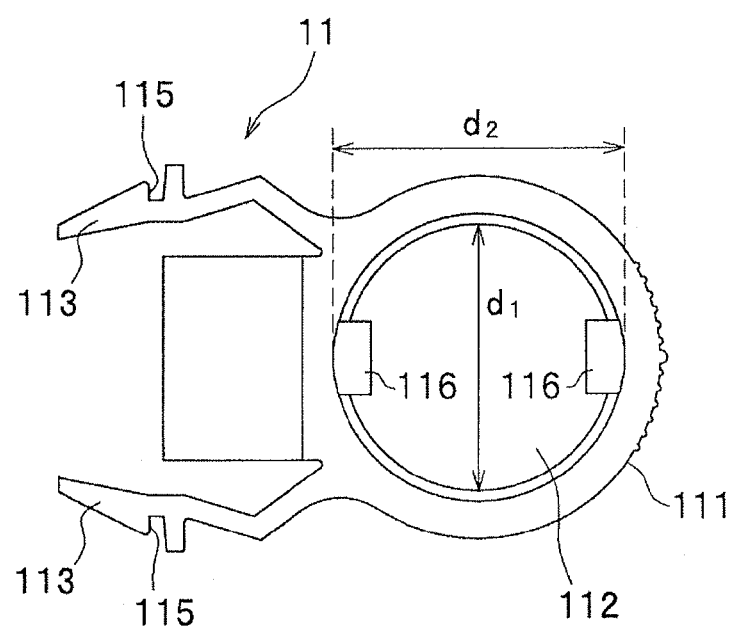
FIG. 3B is a plan view showing the schematic structure of the bracket.
Figure 4A:
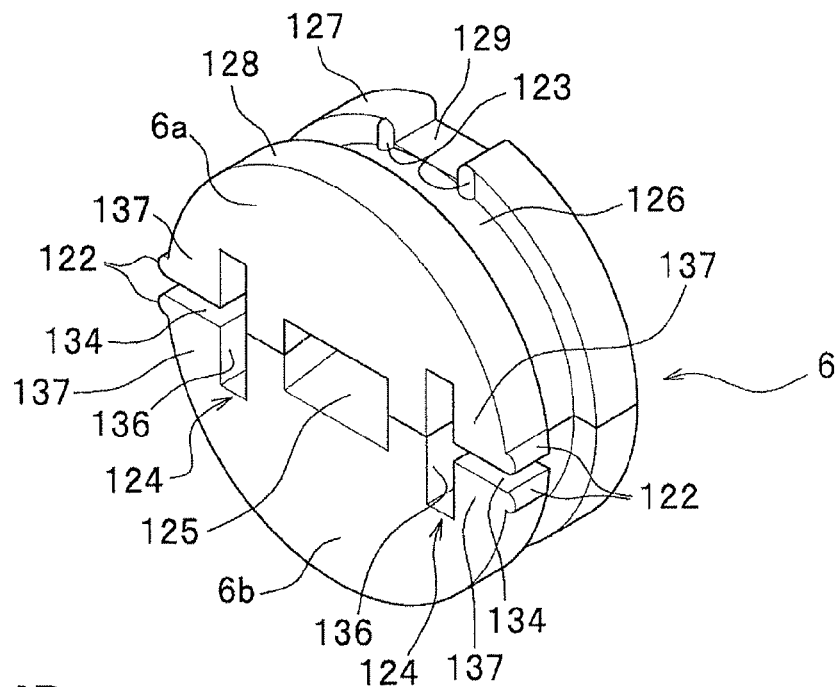
FIG. 4A is a perspective view showing a schematic structure of a holder.
Figure 4B:
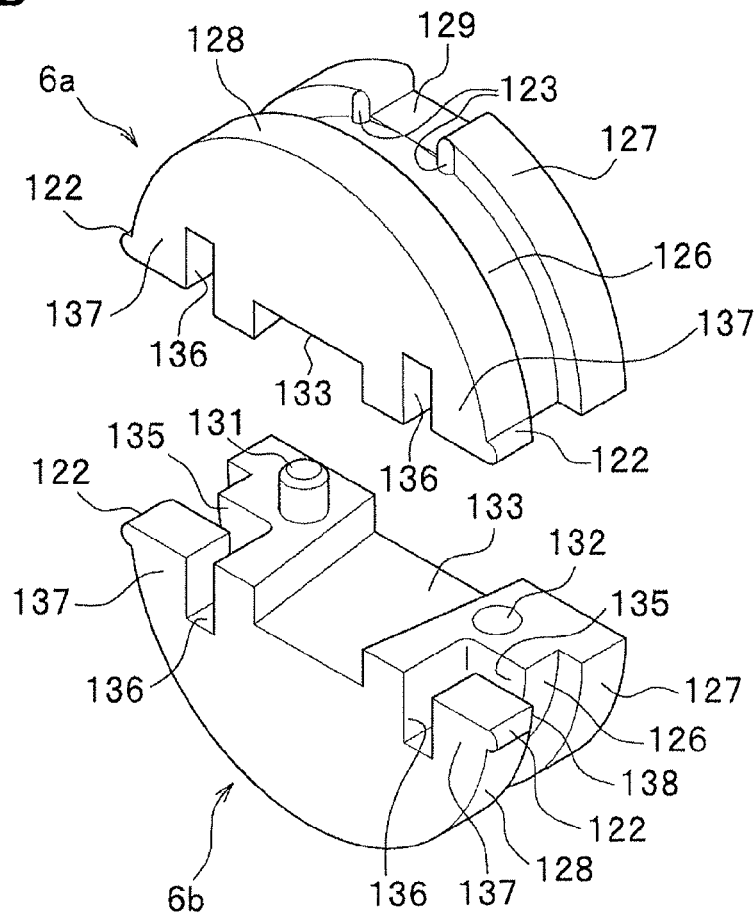
FIG. 4B is an exploded perspective view showing the holder.

A cross sectional view of FIG. 2A taken along A-A line is shown in FIG. 2B, and an enlarged view of FIG. 2B within the dotted line is shown in FIG. 2C. In addition, a perspective view of a schematic structure of a bracket constituting a support is shown in FIG. 3A, and a plan view of the schematic structure of the bracket is shown in FIG. 3B. Furthermore, a perspective view of a schematic structure of a holder constituting the support is shown in FIG. 4A, and an exploded perspective view of the holder is shown in FIG. 4B.
[Structure of Bracket 7]

A structure of the bracket 7 will be explained in detail in reference to FIG. 2A to FIG. 2C and FIG. 3A and FIG. 3B. The bracket 7 has the receiving hole portion 112 for housing the holder 6, and the bracket 7 and holder 6 have a key structure so that the holder 6 can be locked in the receiving hole portion 112. As an element having the key structure in the bracket 7, a prismatic columnar protruding portion 116 protruding toward the center of the receiving hole portion 112 in the radial direction is formed in substantially the center portion in the depth direction on the inner circumferential surface of the receiving hole portion 112.

As shown in FIG. 2B, the protruding portion 116 is housed in an annular groove portion 126 (described later) of the holder 6 to be in contact with a first annular protruding portion 127 (described later), and as a result, the holder 6 is locked in the receiving hole portion 112 of the bracket 7. A procedure for locking the holder 6 in the receiving hole portion 112 of the bracket 7 and a locked status will be explained later in detail. Since the protruding portion 116 is disposed at two positions symmetrical to each other with respect to the center of the receiving hole portion 112 in the radial direction, the holder 6 can be locked stably in comparison with the case that the protruding portion 116 is disposed at only one position.

Assuming that a bottom diameter and an opening diameter of the receiving hole portion 112 are d1 and d2, respectively, as shown in FIG. 2C and FIG. 3B, there is a relation of d1<d2. By forming the inner circumferential surface of the receiving hole portion 112 in a conical shape as shown in the figures, a frictional force for locking the holder 6 in the receiving hole portion 112 of the bracket 7 can be increased, as will be described later. It is noted that in FIG. 2C, the inner circumferential surface of the receiving hole portion 112 has a large gradient for easy understanding. However, an angle θ between a bottom surface of the receiving hole portion 112 and the inner circumferential surface may be set to, for example, 1° to 45°.

The bracket 7 is provided with a fixing portion 11 for attaching and detaching the bracket 7 to and from a predetermined structure. The fixing portion 11 consists of a pair of fixing clicks 113 and the fixing clicks 113 have a spring property so that both end portions of the fixing clicks 113 can approach each other to a predetermined distance. A barb 115 is disposed on the outer side of the fixing click 113. When the bracket 7 is fixed to a structure, the front end of the fixing click 113 is pushed into a receiving portion (not shown) with a certain force. The receiving portion is, for example, configured in such a manner that when the fixing clicks 113 are inserted into the receiving portion at a predetermined depth by bending the fixing clicks 113 so that both ends of the fixing clicks 113 approach to each other, the bending of the fixing clicks 113 is released, and the barbs 115 disposed on the fixing click 113 are fixed in the receiving portions, respectively. In order to give such a spring property to the fixing clicks 113, the bracket 7 is preferably made of resin, for example, polycarbonate (PC), polypropylene (PP), polyethylene (PE), polyamide (PA), polystyrene (PS), polyacetal (POM), and ABS.

In the bracket 7, makers 117 are disposed at regular intervals in the direction opposite to the fixing portion 11. The makers 117 are used as a maker for determining an installation angle of a rotary body which is held by the holder 6.
[Structure of Holder 6]

A structure of the holder 6 will be explained in detail by referring to FIG. 2A to FIG. 2C and FIG. 4A and FIG. 4B. The holder 6 consists of two holder members 6a, 6b which have the same semicircular shapes, by bonding the two holder members 6a, 6b at a plane (hereinafter, referred to as "bonding surface") perpendicular to the main surface of the semicircular shape. As shown in FIG. 4B, a columnar engagement convex portion 128 and an engagement concave portion 32 which engages with the engagement convex portion 128 are disposed on the bonding surface of the holder members 6a, 6b, and the engagement convex portion 128 of one of the holder members 6a, 6b is engaged with the engagement concave portion 32 of the other of the holder members 6a, 6b.

As shown in FIG. 4B, a trapezoidal groove 133 is formed in the center portion of the holder members 6a, 6b. When the holder 6 is assembled by combining the two holder members 6a, 6b, a rotary body holding portion 125 is formed by the combination of the trapezoidal grooves 133. A shape of the rotary body holding portion 125 is designed in accordance with a shape of the portion to which the holder 6 is fixed in the rotary body holding portion 125. The holder 6 is formed in an axial symmetry since the holder 6 is formed by the combination of the two holder members 6a, 6b which have the same shapes, and an axial misalignment and decentering of the holder 6 due to tolerances of the holder members 6a, 6b can be suppressed.

As shown in FIG. 3A, FIG. 3B, FIG. 4A and FIG. 4B, the bracket 7 and the holder 6 have the key structure. As one of the element of the key structure in the holder 6, as shown in FIG. 4A, an annular groove portion 126 which has a constant width and constant depth in the circumferential direction in the center portion of the holder 6 in the thickness direction is formed on the outer circumferential surface of the holder 6. Therefore, a first annular protruding portion 127 constituting one side wall of the annular groove 126 and a second annular protruding portion 128 constituting the other side wall of the annular groove 126 are formed on the outer circumferential surface of the holder 6. It is noted that a half annular groove for forming the annular groove 126 is formed in each of the holder members 6a, 6b constituting the holder 6, and thereby a half protruding portion for forming the first annular protruding portion 127 and a half protruding portion for forming the second annular protruding portion 128 are formed in the holder members 6a, 6b, respectively (see FIG. 4B).

As shown in FIG. 2A, FIG. 2B and FIG. 4A, the holder 6 is housed in the receiving hole portion 112 so that the first annular protruding portion 127 is located on the bottom side of the receiving hole portion 112. Therefore, a recess portion 129 having a width and a depth through which a protruding portion 116 can pass when the holder 6 is attached and detached to and from the receiving hole portion 112 of the bracket 7 is formed in the first annular protruding portion 127. Here, a depth of the recess portion 129 is the same with the depth of the annular groove portion 126.

The protruding portion 116 is disposed in the receiving hole portion 112 at two positions which are point symmetry with respect to the center of the receiving hole portion 112 in the radial direction. Therefore, in accordance with the two positions, the recess portion 129 is disposed at two positions which are point symmetry with respect to the center of the holder 6 in the radial direction. Specifically, the recess portion 129 is formed in substantially a center of the half annular protruding portion provided in the holder members 6a, 6b, respectively. The annular groove 126, the first annular protruding portion 127 and the recess 129 are elements within the holder 6, of the key structure of the bracket 7 and the holder 6.

In the vicinity of the recess 129 on the wall surface of the first annular protruding portion 127 on the side of the annular groove portion 126, a second rib 123 is erected so as to protrude toward the second annular protruding portion 128 over substantially a whole depth direction of the annular groove portion 126. As will be described later, the second rib 123 has a function for preventing the holder 6 from dropping off from the receiving hole portion 112 when the holder 6 is housed in the receiving hole portion 112 of the bracket 7.

An elastic portion 124 divides a semicircular surface of each of the holder members 6a, 6b into two surfaces having substantially the same quarter shape, and is disposed at two positions in each of the holder members 6a, 6b so as to have a plane symmetry with respect to a plane perpendicular to the semicircular surface. The elastic portion 124 is configured by giving mobility to a protruding portion 137 which is surrounded by a first slit 134 to be formed when the holder 6 is assembled by the two holder members 6a, 6b, and a second slit 135 and a third slit 136 which are formed in each of the holder members 6a, 6b. The protruding portion 137 is a part of the second annular protruding portion 128.

The first slit 134 is formed so that the first slit 134 is in parallel with the bonding surface of the holder members 6a, 6b and opened to a circular end face on the side of the second annular protruding portion 128 when the holder 6 is formed. The second slit 135 is opened to a bottom of the half annular groove portion that is a part of the outer circumferential surface of the holder 6, and formed in the holder members 6a, 6b so as to be perpendicular to a thickness direction of the holder 6. The third slit 136 is perpendicular to both the first silt 134 and the second slit 135, and formed in the holder members 6a, 6b to be opened to the circular end face on the side of the second annular protruding portion 128.

In order to give the mobility to the protruding portion 137, the holder members 6a, 6b are preferably made of resins, such as polycarbonate (PC), polypropylene (PP), polyethylene (PE), polyamide (PA), polystyrene (PS), polyacetal (POM), and ABS, which have a suitable mechanical strength and bendability. As shown in FIG. 2A and FIG. 2B, the first rib 122 is slidably in contact with an inner surface of the receiving hole portion 112 formed in the bracket 7, and formed in parallel with a thickness direction of the holder members 6a, 6b at the end of the outer circumferential surface of the protruding portion 137 in order to maximize a degree of freedom of motions of the elastic portion 124.

A height of the first rib 122 is constant in the longitudinal direction. However, the first rib 122 on the side of the annular groove portion 126 is tapered to form a tapered surface 138 so that a ridge line of the first rib 122 becomes shorter than the bottom line thereof (see FIG. 4B and FIG. 2B). This is for the purpose of making easy the operation to house the holder 6 in the receiving hole portion 112, as will be described later.

Under the state that the holder 6 is assembled by the holder members 6a, 6b, if the first rib 122 is pushed toward substantially the center of the holder 6 in the radial direction with a certain force, a whole protruding portion 137 can bend at a neck portion of the protruding portion 137 as a supporting point because the resin which forms the holder members 6a, 6b has a certain bendability. Therefore, the first rib 122 can move toward substantially the center of the holder 6 in the radial direction by a certain distance. In this case, since the second slit 135 and the third slit 136 are further formed, a twisting motion which generates a difference of moving amount toward the radial direction can be generated in the longitudinal direction of the first rib 122.

[Housing Manner of Holder 6 in Bracket 7]

Housing of the holder 6 in the receiving hole portion 112 is performed briefly as follows. After forming the holder 6 by mounting the two holder members 6a, 6b on a rotary body not shown, a side of the first protruding portion 127 is faced to the bottom side of the receiving hole portion 112 of the bracket 7, and the holder 6 is housed in the receiving hole portion 112 so that the protruding portion 116 passes through the recess portion 129. Next, the bracket 7 and the holder 6 are relatively rotated at a predetermined angle.

Figure 5:
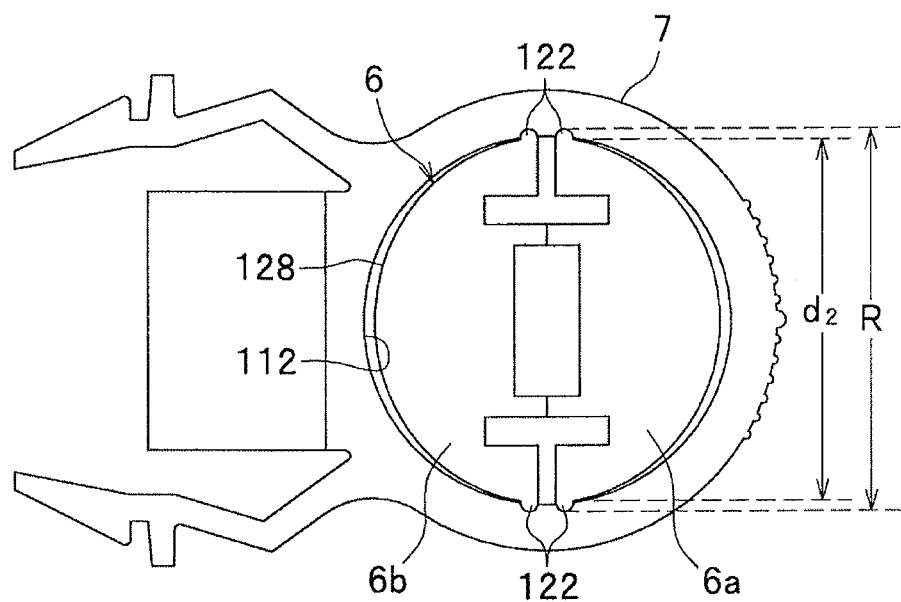
FIG. 5 is a plan view showing both a bracket and a holder overlapping each other at a housing position of the holder.

A plane view showing both a bracket and a holder which overlap each other at a holder housing position is shown in FIG. 5. Before the holder 6 is housed in the receiving hole portion 112 of the bracket 7, a distance R between the ridge lines (top) of the first ribs 122 formed in each of the holder members 6a, 6b is slightly longer than the opening diameter d2 of the receiving hole portion 112. Therefore, in order to fix the holder 6 in the receiving hole portion 112, it is required that the holder 6 is pushed into the receiving hole portion 112 under the condition that the first ribs 122 are pushed toward substantially the center of the holder 6 in the radial direction.

Figure 6A:
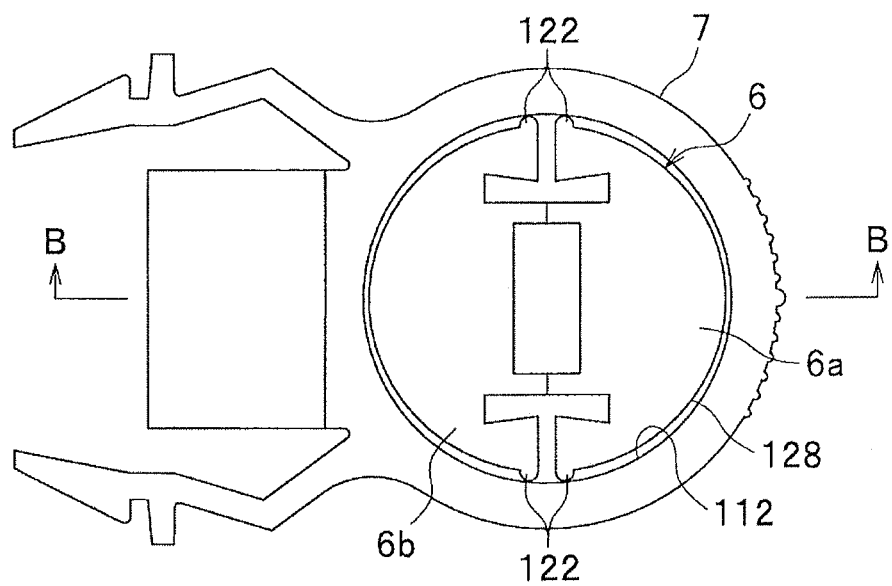
FIG. 6A is a plan view showing a status that a holder is intruded into a receiving hole portion.
Figure 6B:
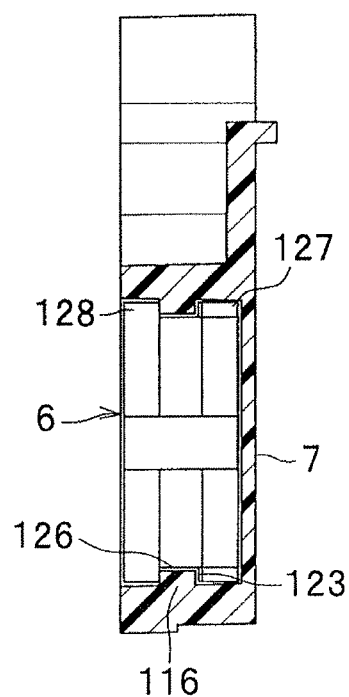
FIG. 6B is a cross sectional view of FIG. 6A taken along B-B line.

A plan view showing a status that a holder is intruded into a receiving hole portion is shown in FIG. 6A. FIG. 6B is a cross sectional view of FIG. 6A taken along B-B line. In order to intrude the holder 6 into the receiving hole portion 112, dimensions of the receiving hole portion 112 at respective positions and dimensions of the holder 6 at respective positions are set as follows.

Namely, a distance between the bottom surface of the receiving hole portion 112 and a wall surface in the protruding portion 116 on the side of the bottom surface of the receiving hole surface portion 112 is wider than a sum of a width (a width in the thickness direction of the holder 6, this is the same with respect to the annular groove portion 126 and the second annular protruding portion 128) of the first annular protruding portion 127 and a height of the second rib 123. An outer diameter of the first annular protruding portion 127 may be identical to, for example, an inner diameter of the bottom surface of the receiving hole portion 112.

A depth of the recess portion 129 formed in the first annular protruding portion 127 is the same with the depth of the annular groove portion 126, and deeper than the height (height in the radial direction of the receiving hole portion 112) of the protruding portion 116. A width (width in the depth direction of the receiving hole portion 112) of the protruding portion 116 is formed narrower than the width of the annular groove portion 126. A width of the second annular protruding portion 128 may be set to an arbitrary value as long as the second annular protruding portion 128 can be housed in the space between the opening face of the receiving hole portion 112 and a wall surface in the protruding portion 116 at the side of the opening face of the receiving hole portion 112. Since the receiving hole portion 112 of the bracket 7 has a conical shape which becomes wider toward the opening face, it is preferable that, for example, a diameter of the second annular protruding portion 128 is set to be larger than that of the first annular protruding portion 127 in order to increase the mechanical strength of the holder 6.

Meanwhile, a depth that the holder 6 can be pushed in the receiving hole portion 112 may be limited by a contact of the end of the holder 6 on the side of the first annular protruding portion 127 with the bottom of the receiving hole portion 112, or may be limited by a contact of a wall surface of the second annular protruding portion 128 on the side of the annular groove portion 126 with the protruding portion 116.

In order to move to a status shown in FIG. 6A from that of FIG. 5, the holder 6 is pushed in the receiving hole portion 112 by adding a certain force to the holder 6 in the thickness direction. In this case, since the first rib 122 has the tapered surface 138, the tapered surface 138 slides against the edge of the opening face of the receiving hole portion 112. Therefore, the first rib 122 is naturally pushed toward the center of the holder 6 in the radial direction, then, the holder 6 is easily fixed in the receiving hole portion 112.

Under the condition that the holder 6 is fixed in the receiving hole portion 112, the first rib 122 receives an external force toward the center of the holder 6 in the radial direction from the inner circumferential surface of the receiving hole portion 112. As a reaction to the external force, the first rib 122 pushes the inner circumferential surface of the receiving hole portion 112 so as to restore the status of the first rib 122 before the holder 6 is fixed in the receiving hole portion 112 due to the effect of the elastic portion 124. Therefore, a frictional force is generated between the first rib 122 and the inner circumferential surface of the receiving hole portion 112.

In this case, the inner circumferential surface of the receiving hole portion 112 is formed in a conical shape, and a twisting motion which generates a difference of moving amount toward the radial direction can be generated on the first rib 122 in the longitudinal direction. Therefore, even if a difference in height corresponding to the taper of the inner circumferential surface of the receiving hole portion 112 is not disposed in the first rib 122, the ridge line portion of the first rib 122 comes in contact with the inner circumferential surface of the receiving hole portion 112 along the taper under the condition that the holder 6 is fixed in the receiving hole portion 112, and pushes the inner circumferential surface. Meanwhile, in this case, since the holder members 6a, 6b are made of resin having bendability, the first rib 122 pushes the inner circumferential surface of the receiving hole portion 112 with a certain surface area including the ridge line.

As shown in FIG. 6A and FIG. 6B, under the condition that the holder 6 is deeply pushed into the receiving hole portion 112, the holder 6 and the bracket 7 can be relatively rotated to each other so that the protruding portion 116 can move inside the annular groove portion 126. In this case, a force larger than a frictional force working between the first rib 122 and the inner circumferential surface of the receiving hole portion 112 is required.

For example, the holder 6 is fixed by fixing a rotary body not shown, which is held by the holder 6, and the bracket 7 is rotated at 90°. After that, if a force pushing the holder 6 into the bottom of the receiving hole portion 112 is released, a force pushing out the holder 6 from the receiving hole portion 112 works between the first rib 122 and the inner circumferential surface of the receiving hole portion 112, since the inner circumferential surface of the receiving hole portion 112 is formed in the conical shape. Therefore, the first rib 122 slides against the inner circumferential surface of the receiving hole portion 112, and the whole holder 6 moves to the opening face side of the receiving hole portion 112, and a wall surface of the first annular protruding portion 127 on the side of the annular groove portion 126 comes in contact with the protruding portion 116. As a result, the holder 6 is locked inside the receiving hole portion 112. Accordingly, a status shown in FIG. 2A and FIG. 2B can be obtained.

When an angle θ (see FIG. 2C) between the bottom surface and the inner circumferential surface of the receiving hole portion 112 is close to 90°, the force to push out the holder 6 from the receiving hole portion 112 becomes small, thereby the frictional force between the protruding portion 116 and the wall surface of the first annular protruding portion 127 on the side of the annular groove portion 126 becomes small. On the other hand, when the angle θ between the bottom surface and the inner circumferential surface of the receiving hole portion 112 is larger than 45°, an contact area between the protruding portion 116 and the wall surface of the first annular protruding portion 127 on the side of the annular groove portion 126 becomes small, thereby the frictional force in the contact area becomes small. In addition, since a whole ridge line of the first rib 122 can not be contact with the inner circumferential surface of the receiving hole portion 112, a frictional force between the first rib 122 and the inner circumferential surface of the receiving hole portion 112 becomes small. Therefore, the angle θ between the bottom surface and the inner circumferential surface of the receiving hole portion 112 is set so that a frictional force generated in the contact portion between the bracket 7 and the holder 6 becomes appropriate.

As shown in FIG. 2A and FIG. 2B, under the condition that the holder 6 is locked in the receiving hole portion 112 of the bracket 7, a frictional force caused by the elastic portion 124 is generated between the first rib 122 and the inner circumferential surface of the receiving hole portion 112. In addition, a frictional force is also generated between the protruding portion 116 and the wall surface of the first annular protruding portion 127 on the side of the annular groove portion 126. Then, the bracket 7 and the holder 6 are relatively rotatable when an external force is larger than the frictional forces. However, when the external force is removed, the bracket 7 and the holder 6 are held by the frictional forces at a position (angle) determined when the external force is removed.

In the support 10, the protruding portion 116 is disposed at two positions which are symmetrical with respect to the center in the radial direction (see FIG. 2B). Then, the stability in the condition that the holder 6 is locked can be improved. In addition, since the holder 6 has such a structure that the holder 6 pushes the inner circumferential surface of the receiving hole portion 112 at four positions of two pairs which are point symmetrical with respect to the center of the holder 6 in the radial direction, the holder 6 can be held stably inside the receiving hole portion 112 without backlashes.

Meanwhile, elements that determine the frictional force between the first rib 122 and the inner circumferential surface of the receiving hole portion 112 may be, for example, (1a) a force (that is, spring force of elastic portion 124) of the first rib 122 pushing the inner circumferential surface of the receiving hole portion 112, (1b) materials (friction coefficient) of the bracket 7 and holder 6, (1c) a surface roughness of the first rib 122 and the inner circumferential surface of the receiving hole portion 112, and (1d) a contact area between the first rib 122 and the inner circumferential surface of the receiving hole portion 112. In addition, elements that determine the frictional force between the protruding portion 116 and the wall surface of the first annular protruding portion 127 on the side of the annular groove portion 126 may be, for example, (2a) materials (friction coefficient) of the bracket 7 and the holder 6, (2b) an angle θ between the bottom surface and the inner circumferential surface of the receiving hole portion 112, (2c) a contact area between the protruding portion 116 and the wall surface of the first annular protruding portion 127 on the side of the annular groove portion 126, and (2d) a surface roughness of the first rib 122 and the inner circumferential surface of the receiving hole portion 112.

A desired frictional force can be obtained by designing structures of the bracket 7 and the holder 6 in consideration of these (1a) to (1d) and (2a) to (2d). In addition, the support 10 which is excellent in durability can also be obtained by considering mechanical strength of the bracket 7 and the holder 6 as a structural part.

When tried to return from the state shown in FIG. 2A to the state shown in FIG. 6A and when tried to rotate the bracket 7 relative to the holder 6 after the status is changed from the state shown in FIG. 6A to the state shown in FIG. 2A, without pushing the holder 6 toward the bottom side of the receiving hole portion 112, the second rib 123 is hit with the protruding portion 116, thereby the bracket 7 is prevented from rotating relative to the holder 6. Therefore, it is not easy to return to the state (FIG. 6A) to fix the holder 6 in the receiving hole portion 112. As a result, the holder 6 can be prevented from dropping off from the bracket 7. When try to detach the holder 6 from the bracket 7, the bracket 7 and the holder 6 are relatively rotated to return to the state shown in FIG. 6A under the condition that the holder 6 is pushed to the bottom side of the receiving hole portion 112 of the bracket 7 so that the second rib 123 slides against or separates from the protruding portion 116.

As described above, the support 10 is extremely simply structured for assembling. In addition, in the support 10, a frictional force between the bracket 7 and the holder 6 can be determined by a geometry design of the bracket 7 and the holder 6. Therefore, a holding angle of the rotary body can be easily adjusted without depending on an individual force level of the setting operator of the rotary body, and the adjusted angle can be held stably.

Next, a lighting unit according to the embodiment will be explained by using drawings.

Figure 7:
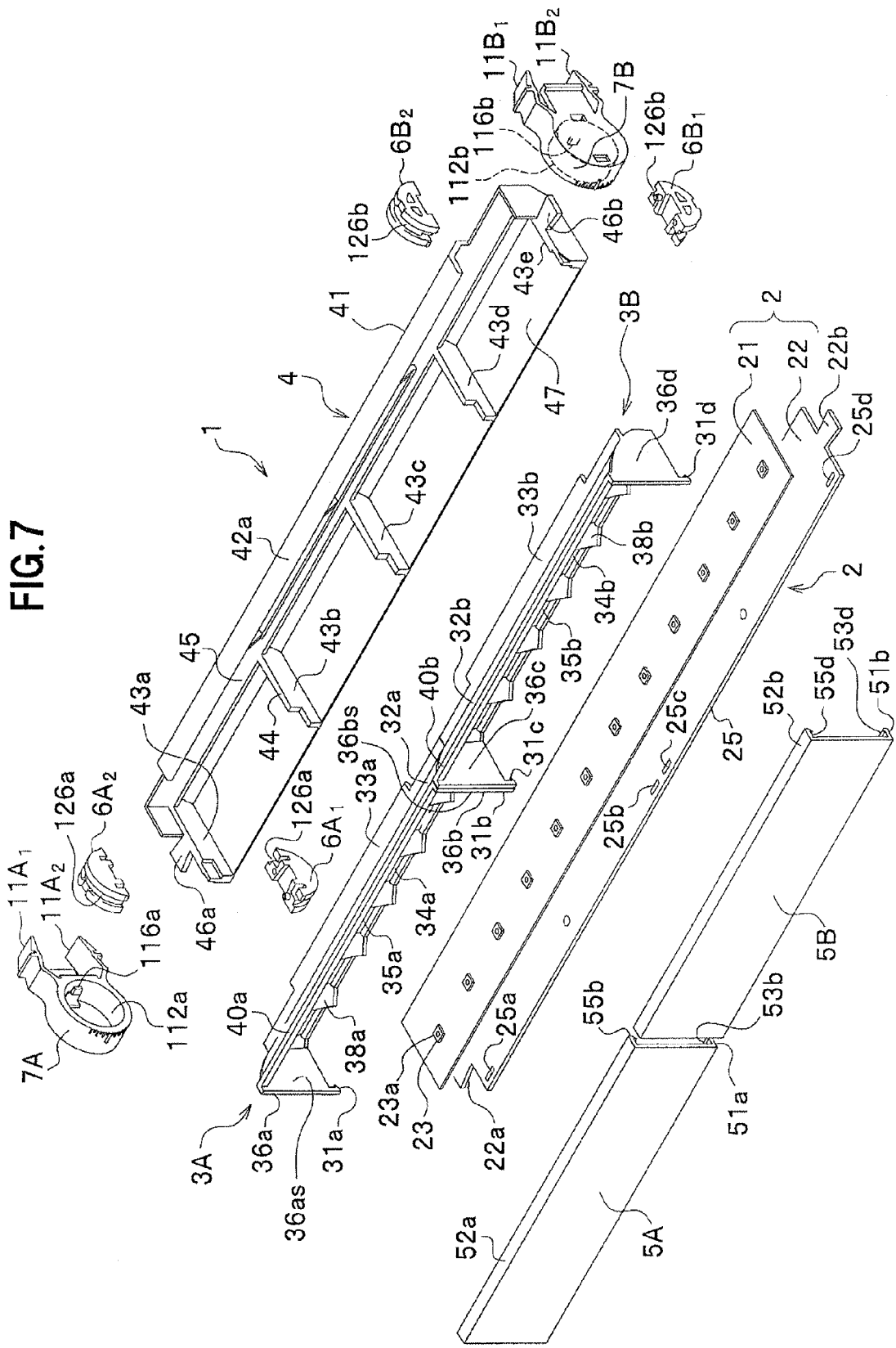
FIG. 7 is an exploded perspective view showing a structure of a lighting unit of the present invention.
Figure 8:
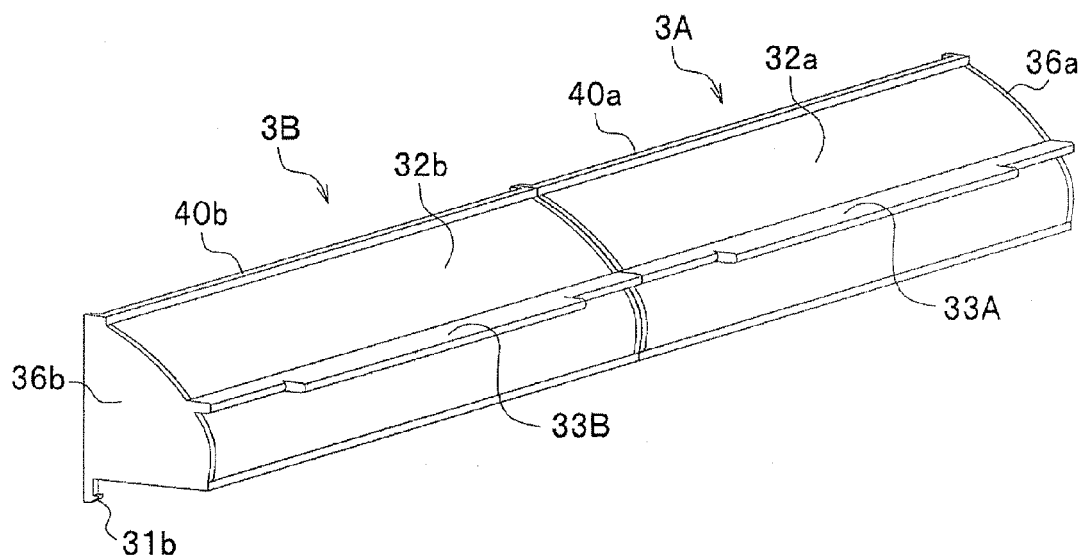
FIG. 8 is a perspective view showing a backside of a reflector member.
Figure 9:
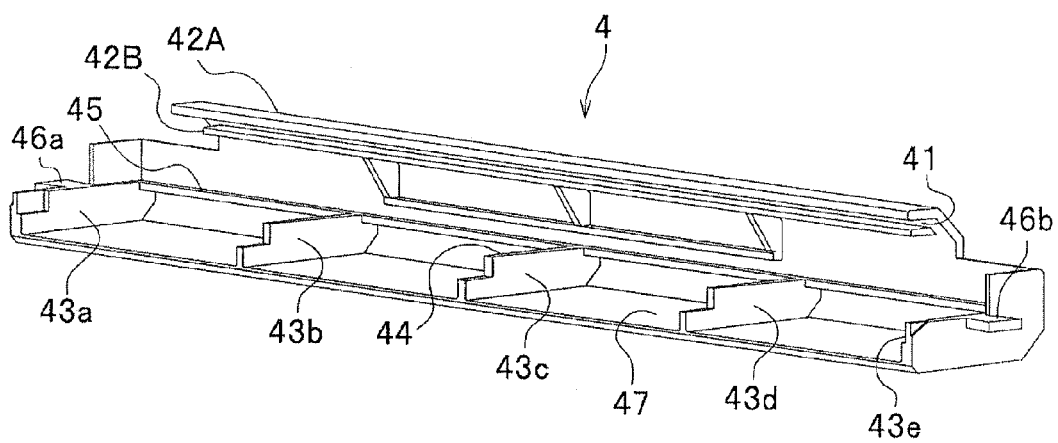
FIG. 9 is a perspective view showing a case member.
Figure 10:
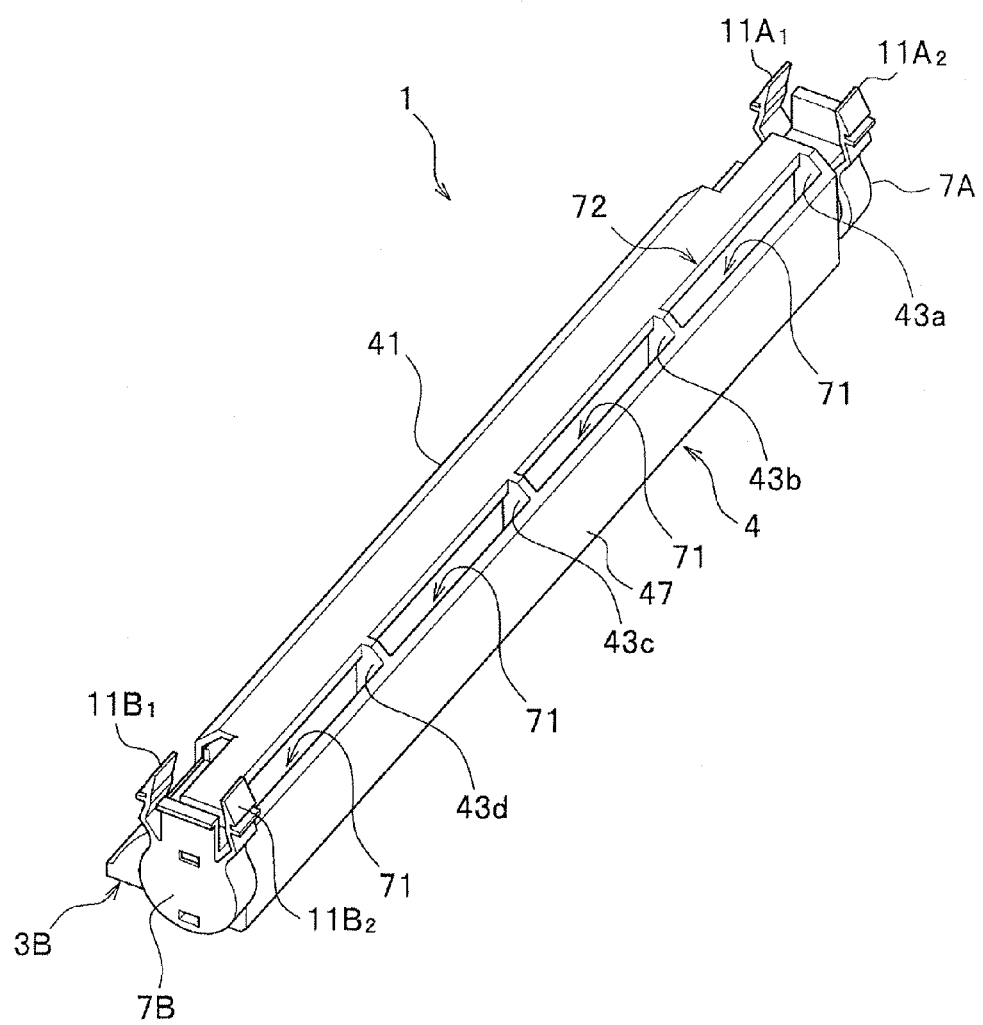
FIG. 10 is a backside perspective view of a lighting device.
Figure 11A:
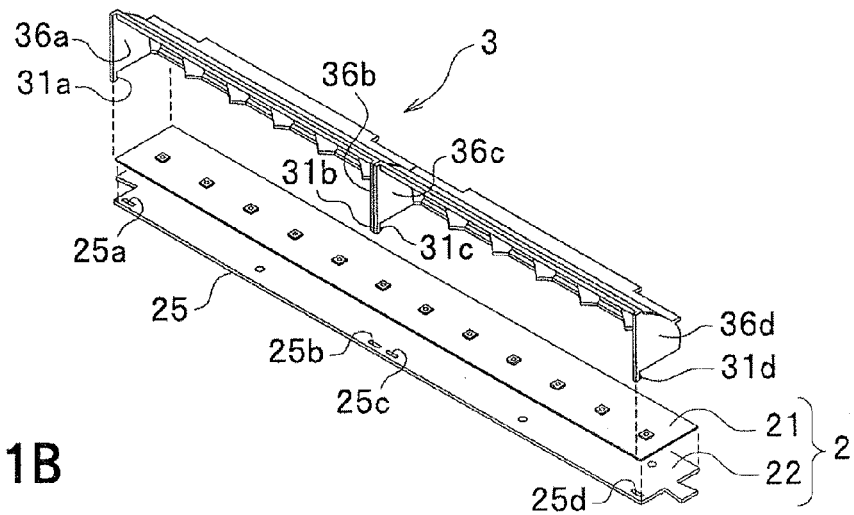
FIG. 11A to FIG. 11C are views for explaining an assembly process of a lighting unit of the present invention.
Figure 11B:
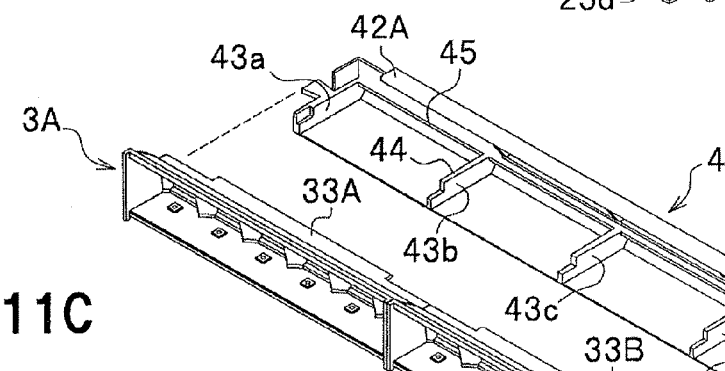
Figure 11C:
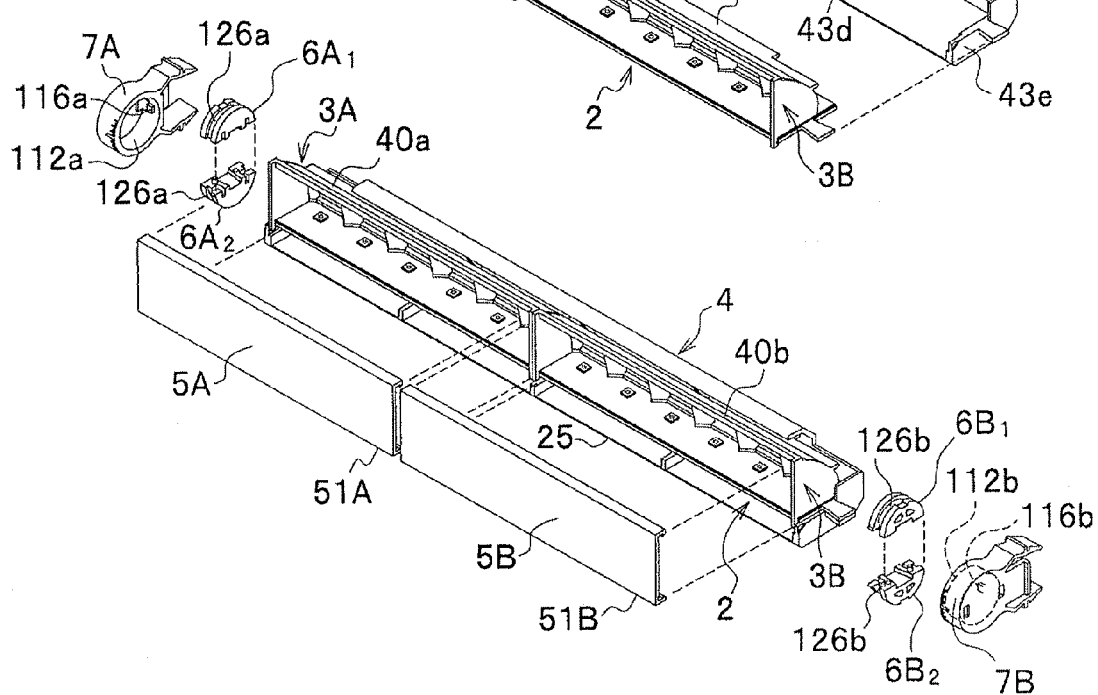
Figure 12A:
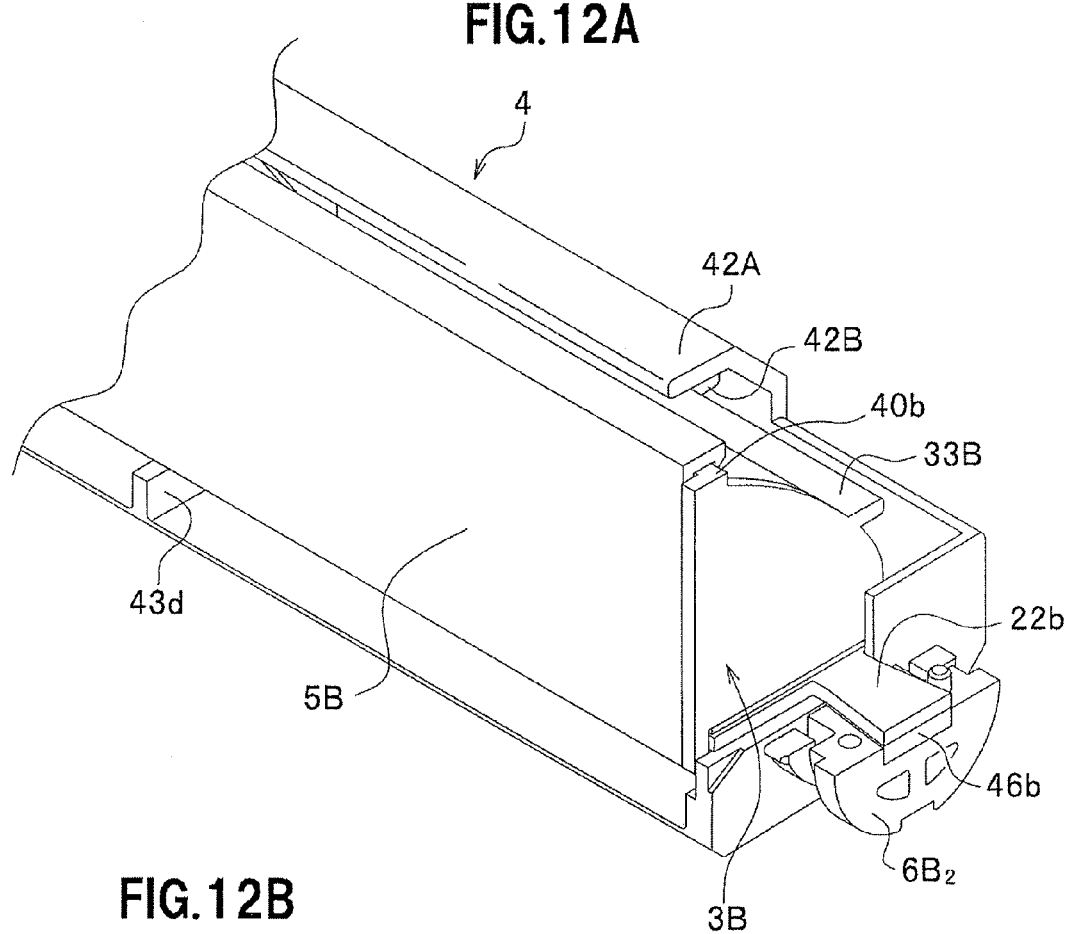
FIG. 12A is a perspective view showing a part of a lighting unit of the present invention.
Figure 12B:
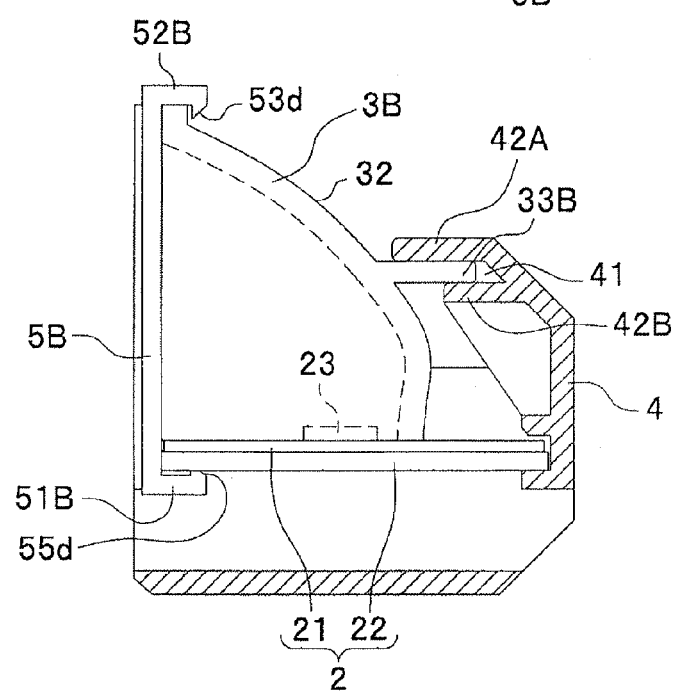
FIG. 12B is a schematic cross sectional view for explaining an assembled status of the lighting unit of the present invention.
Figure 13A:
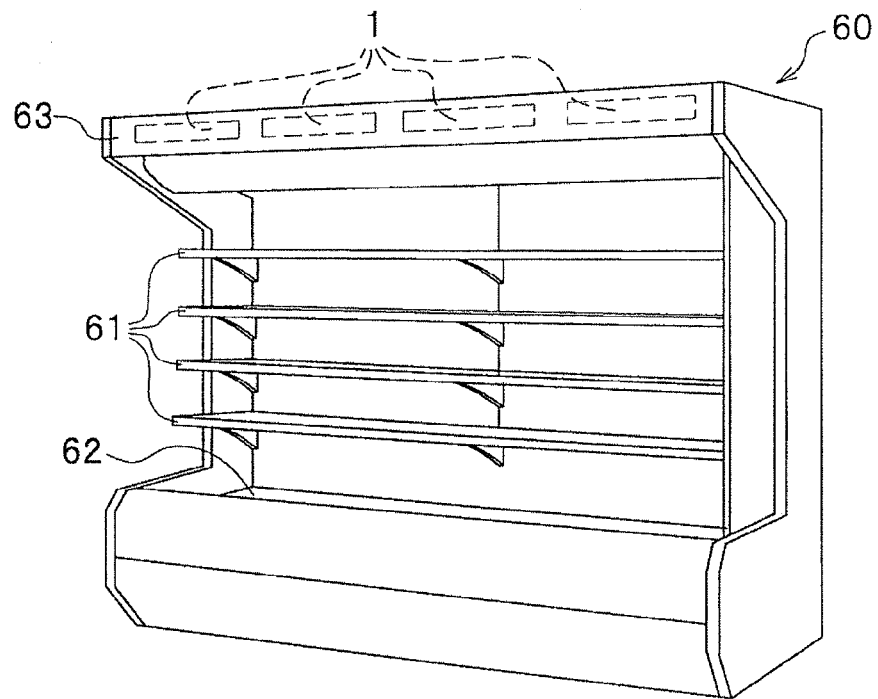
FIG. 13A is a schematic perspective view of a showcase provided with a lighting device.
Figure 13B:
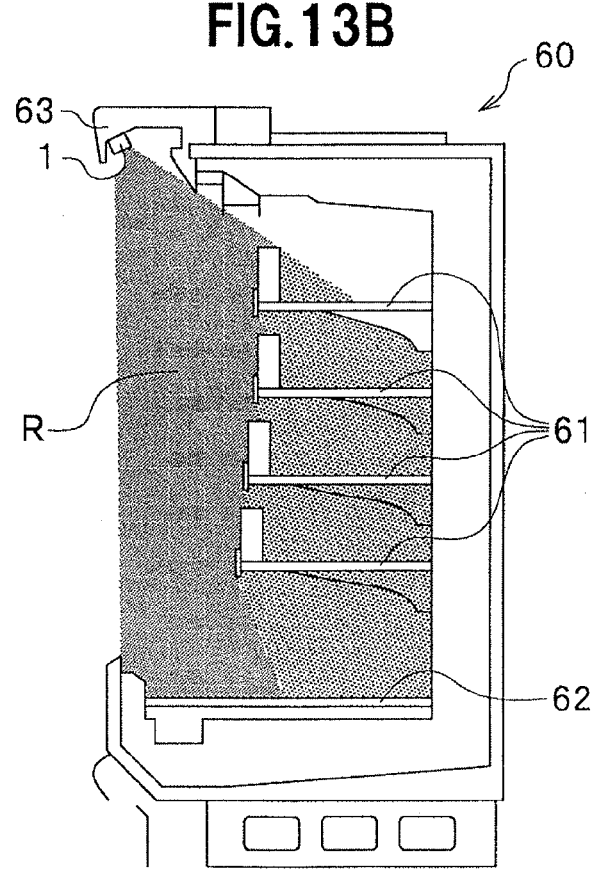
FIG. 13B is a view schematically showing a light distribution of an illumination light in the showcase.

FIG. 7 is an exploded perspective view showing a structure of a lighting unit of the present invention, FIG. 8 is a perspective view showing a backside of a reflector member, FIG. 9 is a perspective view showing a case member, FIG. 10 is a backside perspective view of a lighting device, FIG. 11A to FIG. 11C are views for explaining an assembly process of a lighting unit of the present invention, FIG. 12A is a perspective view showing a part of a lighting unit of the present invention, FIG. 12B is a schematic cross sectional view for explaining an assembled status of the lighting unit of the present invention, FIG. 13A is a schematic perspective view of a showcase provided with a lighting device, and FIG. 13B is a view schematically showing a light distribution of an illumination light in the showcase.

As shown in FIG. 7, a lighting unit 20 includes a board 2, reflector members 3A, 3B, a case member 4, cover members 5A, 5B, holder members $6A_1$, $6A_2$, $6B_1$, $6B_2$, and brackets 7A, 7B.

The board 2 is formed by bonding a circuit board 21 and a heatsink board 22. The circuit board 21 is formed in a rectangular shape, and a plurality of light emitting portions 23 each of which includes a semiconductor light emitting device 23a are disposed on one main surface of the circuit board 21 at predetermined intervals in the longitudinal direction. A wiring pattern (not shown) for emitting a light by the semiconductor light emitting device 23a is disposed on the circuit board 21, in addition, a wiring for emitting a light by the semiconductor light emitting device 23a is disposed on the circuit board 21, and furthermore, various kinds of elements (not shown) such as a transistor, a resistor, and a zener diode which are used for emitting a light by the semiconductor light emitting device 23a are mounted on the circuit board 21. As a material of the circuit board 21, material having a high thermal conductivity is preferably used in order to effectively dissipate a heat which is generated when the semiconductor light emitting device 23a emits light, and, for example, a glass epoxy board and an aluminum board are preferably used.

The heatsink board 22 is made of metal materials having high thermal conductivity, such as aluminum, cupper, iron, and stainless steel. On both ends of the heatsink board 22 in the longitudinal direction, trapezoidal board holding ends 22a, 22b which become wider outward in the longitudinal direction of the heatsink board 22 are disposed in order to engage with a pair of holder members $6A_1$, $6A_2$ and a pair of holder members $6B_1$, $6B_2$. In addition, in the vicinity of a long side edge (hereinafter, referred to as "front edge") 25 of the heatsink board 22 on the side of the cover 5A, engagement ports 25a, 25b, 25c, 25d for engaging with the cover members 5A, 5B are disposed.

In the board 2, it is preferable that the circuit board 21 and the heatsink board 22 are bonded via a thermal conducting sheet (not shown). The thermal conducting sheet preferably has a thermal conductivity, for example, not less than 0.1 to 10 W/(m·K) and an insulating property. This prevents the circuit board 21 and the heatsink board 22 from forming a short circuit therebetween, and can effectively dissipate a heat generated by the semiconductor light emitting devices 23a, while maintaining insulation among the light emitting portions 23. As the thermal conducting sheet, for example, a silicone rubber may be used. When the thermal conducting sheet is used, a thinner one (less than 0.1 mm) is preferable for increasing the heat dissipation. In addition, as for a shape and a size of the thermal conducting sheet, although they can be adjusted as appropriate in consideration of, for example, a shape and a size of the lighting unit 20, it is preferable that the shape and the size of the thermal conducting sheet are substantially identical to those of the circuit board 21.

It is noted that the board 2 may be a structure in which the circuit board 21 and the heatsink board 22 are integrally formed. In this case, it is preferable to use a board on which an electrically conductive pattern is formed on a high thermally conductive material such as aluminum and cupper via an insulating layer. A bottom surface of the heatsink board 22 may be roughed, or, for example, concaves/convexes may be formed on the bottom surface, in view of increasing the heat dissipation.

The light emitting portion 23 is preferably disposed on the upper surface of the board 2 at constant intervals. This enables to realize a homogeneous light distribution and to homogenize a distribution of a heat generated by the semiconductor light emitting device 23a.

The light emitting portion 23 includes one or a plurality of semiconductor light emitting devices 23a. It is preferable that the semiconductor light emitting device 23a constituting the light emitting portion 23 has a light distribution following substantially the Lambert distribution when observed from upper side of the board 2. This enables to make the lighting unit 20 less glare with a high efficiency, as well as a small brightness variation. In addition, it is preferable that the light emitting portion 23 is disposed on the upper surface of the board 2 at constant intervals. This enables to realize a homogeneous light distribution and to homogenize a distribution of a heat generated by the semiconductor light emitting devices 23a. Especially, if the light emitting device 23a emitting lights corresponding to RBG is used, a color mixture can be improved in comparison with the case that a semiconductor light emitting device emitting a monochromatic light is used. The semiconductor light emitting device 23a is not specifically limited as long as a light suitable for the purpose of the lighting unit 20 is emitted from the device.

It is noted that the light emitting portion 23 may be the semiconductor light emitting device 23a itself, and may be covered with, for example, a package or a cover member. As the package or the cover member, a member containing a wavelength conversion member (for example, fluorescent material) or a diffusion agent may be used.

The reflector members 3A, 3B reflect a light of the semiconductor light emitting device 23a in a predetermined direction. In addition, each of the reflector members 3A, 3B has a length of about half of the length of the circuit board 21, and is disposed on the board 2 being aligned in the longitudinal direction of the board 2. Meanwhile, since both the reflector members 3A, 3B have the same structure, the structure of the reflector 3A which is one of the reflector members 3A, 3B will be explained.

As shown in FIG. 7, the reflector member 3A includes side plates 36a, 36b which are disposed at both respective ends of the reflector member 3A in the longitudinal direction and have substantially a ¼ circle (a quarter of a circle) shape which is substantially perpendicular to the board 2, a reflector dome portion 32a which covers the upper surface of the board 2 along circular arcs of the side plates 36a, 36b and opens at a face which connects sides in the side plates 36a, 36b and perpendicular to the board 2, and a side reflector 38a which is disposed being projected between the light emitting portions 23 and corresponded to each of the light emitting portions 23 at an inner side of the reflector dome portion 32a.

The reflector member 3A also includes engagement clicks 31a, 31b which are disposed at bottom portions of respective side plates 36a, 36b, to be engaged with the engagement ports 25a, 25b which are formed in the vicinity of the front edge 25 of the heatsink board 22, and a projected line portion 40a at an upper end of the opening of the reflector dome portion 32a, extending in the longitudinal direction and in parallel with the opening face in order to engage with the cover 5A.

In addition, as shown in FIG. 7 and FIG. 8, on backsides of the reflector members 3A, 3B, engagement projected line portions 33A, 33B are erected on a backside 32 along the longitudinal direction. The engagement projected line portions 33A, 33B may be disposed over a whole width of the backside 32 of the reflector member 3 in the longitudinal direction, or as shown in FIG. 7 and FIG. 8, the backside 32 of the reflector 3 may be divided and one or a plurality of engagement projected line portions may be erected in each divided portion. In addition, shapes of the engagement projected line portions 33A, 33B may be not only the shapes projected rearward as shown in FIG. 7 and FIG. 8, but also any shape as long as the shape corresponds to and engages with a shape of an engagement line groove portion 41. The engagement projected line portions 33A, 33B are engaged with the engagement line groove portion 41 (see FIG. 9) of a case member 4 described later, thereby the reflector member 3 and the case member 4 are connected.

In addition, the reflector member 3A includes a reflection portion 34a which reflects a light emitted from the semiconductor light emitting device 23a disposed in the light emitting portion 23, at an inner surface of the reflector member 3A covering the light emitting portion 23 disposed on the board 2. The reflection portion 34a is formed on an upper inner surface 35a covering above the plurality of light emitting portions 23 and on inner surfaces 36 as, 36bs of the side plates 36a, 36b of the reflector member 3A, from the upper surface to the rear edge of the board 2.

It is preferable that the reflection portion 34a disposed on the upper inner surface 35a of the reflector member 3A is provided with a multi-reflector consisting of a plurality of reflection mirrors which are corresponded to respective light emitting portions 23 and disposed on each of upper surfaces and backsides of a plurality of light emitting portions 23 arrayed on the upper surface of the board 2. The reflection mirrors constituting the multi-reflector output lights emitted from the semiconductor light emitting devices 23a of the light emitting portions 23 from a front side of the lighting unit 20 as the reflection lights which have different optical axes, respectively, and, for example, a curvature, an optical axis direction and an arrangement of the light emitting portion 23 are suitably determined depending on a reflector arrangement in consideration of the directivity of the light emitting portion 23 and a distance to the light emitting portion 23, a distance to the area for the lighting and the extent of the lighting, and further a light incident angle, so that a large homogeneous light intensity can be obtained over a wide area. In addition, it is preferable that arrangement angles of the reflection mirrors constituting the multi-reflector are adjusted so that lights from the semiconductor light emitting devices 23a can be output as the reflection lights having different optical axes, respectively. This enables the lighting unit 20 to have a homogeneous light intensity over a wide area.

In addition, it is preferable that the reflection mirror constituting the multi-reflector has a larger area and a longer focal distance as the reflection mirror leaves from the semiconductor light emitting portion 23. Configuring the multi-reflector as described above, a long distance area can be illuminated by the reflection mirror disposed distant from the light emitting portion 23, and a short distance area can be illuminated by the reflection mirror disposed close to the light emitting portion 23. Accordingly, the lighting unit 20 which has a homogeneous light intensity over a wide area can be obtained. For example, if the lighting unit 20 described in the embodiment is arranged in the front uppermost of a multiple-stage open-showcase and illuminates inside the showcase, a lower stage as well as an upper stage can be illuminated homogeneously. Accordingly, it is unnecessary to dispose a lighting mean at a lower portion of each stage of the showcase, thereby resulting in large cost reduction. In addition, the running cost and the maintenance cost can also be reduced by using the semiconductor light emitting device 23a.

In the reflection mirror constituting the multi-reflector, when the semiconductor light emitting device 23a whose brightness variation/color variation effect on the illumination variation is used, it is preferable that a light reflection surface of the multi-reflector (reflection portion) is treated to have a diffusion effect.

In addition, it is preferable that the reflection mirror constituting the multi-reflector has a spherical surface or non-spherical surface (for example, paraboloidal surface and ellipsoidal surface) which collects a light from the light emitting portion 23, and a shape of the multi-reflector obtained by adjusting arrangement angles of these surfaces has a cylindrical mirror shape having a focal point at the light emitting portion 23. As a result, the lighting unit 20 which has a light output from the light emitting portion 23, having no illumination variation/color variation over a wide area in the longitudinal direction, and effectively collected in a desired extent with homogeneous light intensity in the lateral direction, can be obtained. In addition, the multi-reflector may be formed in a defocus mirror shape having a focal point at the light emitting portion 23. This has advantages capable of improving the brightness variation and the color variation of the semiconductor light emitting device 23a.

In addition, it is preferable that the multi-reflector disposed on the upper inner surface 35a of the reflector member 3A has a side reflector 38 which is disposed protruding between the light emitting portions 23 and corresponding to each of the light emitting portions 23 to lay out the multi-reflector. By disposing the side reflector protruding between a plurality of light emitting portions 23, a non-utilized light going toward the longitudinal direction of the board 2 from each of the light emitting portions 23 can be effectively output toward the side of the light extraction direction (front side of lighting unit 20) in the lateral direction of the board 2.

The reflector member 3B includes side plates 36c, 36d, a reflector dome 32b, a side reflector 38b, engagement clicks 31c, 31d, an engagement projected line portion 33b and a projected line portion 40b, as with the reflector member 3A. Since a function and etc. of each of these elements are the same with those of the reflector member 3A, the explanation will be omitted.

As the reflector members 3A, 3B, a reflector member provided with, for example, a reflection mirror which is formed by evaporating or plating a metal film (for example, Al film) having a high light reflectivity on a resin molding product of, for example, ABS, polycarbonate and acrylic, a reflection mirror which is formed by evaporating or plating a metal film having a high light reflectivity on a metal press work product of, for example, Al, and a press work product of, for example, an Al plate on which a high reflectivity film as the reflection mirror is formed in advance, is preferably used.

The case member 4 supports the board 2 and holds the reflector members 3A, 3B. As a material of the case member 4, resins, for example, ABS, polycarbonate and acrylic may be used.

As shown in FIG. 9, the case member 4 has an engagement line groove portion 41 to be engaged with the engagement projected line portions 33A, 33B of the reflector member 3 at an upper end edge. The engagement line groove portion 41 consists of an upper end tongue 42A and a lower end tongue 42B which are protruded at the upper end edge of the case member 4. A width (a distance between the upper end tongue 42A and the lower end tongue 42B) of the engagement line groove portion 41 in the lateral direction is formed in such a manner that the engagement projected line portions 33A, 33B of the reflector members 3A, 3B can be engaged with the width.

It is noted that the engagement projected line portions 33A, 33B of the reflector members 3A, 3B may be disposed over a whole width of the reflector dome portions 32a, 32b of the reflector members 3A, 3B in the longitudinal direction. In addition, shapes of the engagement projected line portions 33A, 33B are not limited to a shape protruding rearward as shown in FIG. 7 and FIG. 8. Namely, the shapes of the engagement projected line portions 33A, 33B erected on the backsides of the reflector members 3A, 3B and a shape of the engagement line groove portion 41 disposed in the case member 4 are determined as appropriate so as to lock or engage with each other.

In the case member 4, the shape of the engagement line groove portion 41 is not limited to a shape formed by the upper end tongue 42A and the lower end tongue 42B which are protruded at the upper end edge of the case member 4 as shown in FIG. 7 and FIG. 9, and determined as appropriate depending on shapes of the engagement projected line portions 33A, 33B erected on the backside of the reflector member 3.

In addition, in the case member 4, board support ribs 43a, 43b, 43c, 43d, 43e supporting a bottom side of the board 2 are vertically disposed on a bottom plate portion 47 which is disposed continuously from the upper end edge where the engagement line groove portion 41 is disposed. The support ribs 43a, 43e at both ends form side ends of the case member 4, respectively. In addition, an upper surface 44 of each of the board support ribs 43a, 43b, 43c, 43d, 43e is formed in a plane identical to a support surface 45 disposed in the inner backside and supports the bottom side of the board 2. Meanwhile, the engagement line groove portion 41 is connected to each of the board support ribs 43a, 43b, 43c, 43d, 43e.

As shown in FIG. 10, when the board 2 is supported by the board support ribs 43a, 43b, 43c, 43d, 43e, the bottom of the board 2 is protected by the bottom plate portion 47 of the case member 4. Therefore, for example, people are prevented from directly touching the board 2 which is raised in temperature even if the people try to access the lighting device 1 for adjusting the lighting device 1 during use of the lighting device 1. In addition, a space portion 71 is formed between the board 2 and the bottom plate portion 47, and heat can be effectively dissipated from the space portion 71. The heat dissipation from the board 2 will be explained later in detail by referring to FIG. 14.

On both ends of the case member 4 in the longitudinal direction, case holding ends 46a, 46b which become wider outward (reverse taper) in the longitudinal direction of the case member 4 are disposed protruded outward. When the lighting device 1 is assembled, the case holding ends 46a, 46b are overlapped with the board holding ends 22a, 22b disposed at both ends of the heat dissipation member 22 of the board 2, respectively, next, the overlapped portions are sandwiched by a pair of holder members $6A_1$, $6A_2$ and a holder members $6B_1$, $6B_2$ which are the pair of top and bottom, and the case holding ends 46a, 46b are engaged with taper grooves 6a, 6b of each of the holder members $6A_1$, $6A_2$, $6B_1$, and $6B_2$ being overlapped to be held therein. The holder members $6A_1$, $6A_2$, $6B_1$, and $6B_2$ holding the overlapped case holding ends 46a, 46b and the board holding ends 22a, 22b are engaged with the receiving hole portions 112a, 112b of the brackets 7A, 7B. In this case, protruding portions 116a, 116b which are disposed on the inner surface of the receiving hole portions 112a, 112b of the brackets 7A, 7B, respectively, are slidably engaged with the annular grooves 126a, 126b which are formed in the outer circumference of each of the holder members $6A_1$, $6A_2$, $6B_1$, and $6B_2$. As a result, the board 2 and the case member 4 are rotatably held.

A material of the cover members 5A, 5B is not specifically limited as long as the material is transmissive for a light from the semiconductor light emitting device 23a, and the cover members 5A, 5B may be made of well known materials in this field. The cover members 5A, 5B are made of, for example, plastic which is light and strong, especially, in consideration of the workability and heat resistance, resin materials such as polycarbonate and acrylic are preferable. Here, the light transmissivity of the material includes translucent and opaque (for example, light transmissivity not less than around 50% and milky white) in consideration of color mixture and color variation, although the light transmissivity of the light from the mounted semiconductor light emitting device 23a is preferably 100%.

The cover members 5A, 5B are provided with lower engagement portions 51A, 51B to be engaged with the front edge 25 of the board 2 at the bottom side and upper engagement portions 52A, 52B to be engaged with the projected line portions 40a, 40b of the reflector members 3A, 3B at the upper side. On both ends of the lower engagement portions 51A, 51B, four engagement clicks (engagement clicks 53b, 53d are shown, other two are not shown) to be engaged with the engagement ports 25a, 25b, 25c, 25d, which are formed in the heatsink board 22, from the bottom side of the heatsink board 22 are disposed. In addition, on both ends of the upper engagement portion 52A, 52B, four engagement clicks (engagement clicks 55b, 55d are shown, other two are not shown) to be engaged with the projected line portion 40a, 40b of the reflector member 3A, 3B are disposed.

In addition, the cover members 5A, 5B may have a light diffusion effect. Using the cover members 5A, 5B having the light diffusion effect, a lighting unit capable of suppressing the illumination variation can be obtained, even if the semiconductor light emitting device 23a whose brightness variation/color variation effects on the illumination variation is used. Here, the light diffusion effect indicates a member which is capable of diffusing a light from the semiconductor light emitting device 23a, and the cover member itself may be given the light diffusion effect by a treatment, or another member having the light diffusion effect may be combined with the cover members 5A, 5B. For example, a diffusing sheet (for example, a thin sheet made of resin which is translucent or milky white) may be attached on the front side and/or the back side (inner side) of the cover members 5A, 5B, or a roughing treatment such as a sandblast or polishing may be provided on the front side and/or the back side of the cover members 5A, 5B. In addition, a diffusing agent (for example, filler such as silicon oxide) may be mixed with the material for forming the cover members 5A, 5B. Accordingly, a light from each of the semiconductor light emitting devices 23a may be transformed into a homogeneous area light source.

Next, a method for assembling the lighting device 1 will be explained by mainly referring to FIG. 11A to FIG. 11C. First, as shown in FIG. 11A, the circuit board 21 and the heatsink board 22 are bonded to form the board 2, and the reflector members 3A, 3B are fixed to the board 2. The circuit board 21 and the heatsink board 22 may be bonded through a heat conductive sheet (not shown). The fixing of the reflector members 3A, 3B to the board 2 is conducted as follows. The reflector members 3A, 3B are arranged so that the side plate 36b of the reflector member 3A and the side plate 36c of the reflector member 3B are close to each other, and the engagement clicks 31a, 31b, 31c, 31d are engaged with the front edge 25 of the board 2.

Next, as shown in FIG. 11B, the board 2 to which the reflector members 3A, 3B were fixed is fixed to the case member 4. More specifically, a bottom side (heatsink 22 side) of the board 2 is placed on the upper surface 44 of each of the support ribs 43a, 43b, 43c, 43d, 43e of the case member 4, and the board 2 and the reflector members 3A, 3B are trusted into the back of the case member 4 from the front side. Then, the bottom side of the board 2 is supported by the upper surface 44 and the support surface 45 of each of the support ribs 43a, 43b, 43c, 43d, 43e of the case member 4, and the space portion 71 is formed (see FIG. 10) between the bottom surface of the board 2 and the bottom plate portion 47 of the case member 4. In addition, the engagement projected line portions 33a, 33b disposed on the reflector members 3A, 3B are held in the engagement line groove portion 41. In addition, the board holding end 22a and the case holding end 46a overlap each other (see FIG. 12A), and the board holding end 22b and the case holding end 46b overlap each other too.

Next, as shown in FIG. 11C, the overlapped board holding end 22a and the case holding end 46a (not shown in FIG. 11C) are sandwiched by the pair of holder members $6A_1$, $6A_2$, and housed in a hole which is formed by combining the trapezoidal grooves 6a, 6b disposed on each of the holder members $6A_1$, $6A_2$. After that, the holder members $6A_1$, $6A_2$ are locked in the receiving hole portion 112a of the bracket 7A. Similarly, the overlapped board holding end 22b and the case holding end 46b are sandwiched by the pair of holder members $6B_1$, $6B_2$, and housed in a hole which is formed by combining the trapezoidal grooves 6a, 6b disposed on each of the holder members $6B_1$, $6B_2$. After that, the holder members $6B_1$, $6B_2$ are locked in the receiving hole portion (not shown) of the bracket 7B.

Next, as shown in FIG. 11C, the lower engagement portions 51A, 51B of the cover members 5A, 5B are engaged with the front edge 25 of the board 2, and the upper engagement portions 52A, 52B are engaged with the projected line portion 40a, 40b of the reflector members 3A, 3B. More specifically, four engagement clicks (engagement clicks 53b, 53d are shown, other two are not shown) disposed in the lower engagement portions 51A, 51B are engaged with the engagement ports 25a, 25b, 25c, 25d disposed on the heatsink board 22, and four engagement clicks (engagement clicks 55b, 55d are shown, other two are not shown) disposed in the upper engagement portions 52A, 52B are engaged with the projected line portions 40a, 40b of the reflector members 3A, 3B (see FIG. 12B).

As described above, the cover members 5A, 5B are mounted on the opening face (illumination surface) of the reflector members 3A, 3B. Therefore, the reflector members 3A, 3B and the board 2 are tightly fixed to each other, and the lighting device 1 shown in FIG. 1 and FIG. 10 is assembled accordingly. As understood from the above description, the lighting device 1 can be assembled simply and easily by engaging and locking mutual members through, for example, engagement portions disposed on respective positions without using a fixing member such as a screw. In addition, by mutually connecting each of the constituent members through engagement/locking between the mutual members, a fixing strength among the constituent members can be maintained for a long time after the assembling.

Then, as shown in FIG. 1, the lighting unit 20, in which the board 2, the reflector members 3A, 3B, the case member 4 and the cover members 5A, 5B are tightly fixed to each other, is rotatably held by the brackets 7A, 7B mounted on the respective ends. The lighting device 1 can be fixed to a required position by mounting the brackets 7A, 7B on the position to which the lighting unit 20 is fixed and on the mounting portion disposed on the side of the lighting device 1. In this case, a pair of fixing portions $11A_1$, $11A_2$ and a pair of fixing portions $11B_1$, $11B_2$ on one end of respective brackets 7A, 7B, are inserted into fixing ports (not shown) disposed on the mounting side (place, device), and clicks 12 of the fixing portions $11A_1$, $11A_2$ and the fixing portions $11B_1$, $11B_2$ are locked to the inner side of the fixing ports. When the fixing portions $11A_1$, $11A_2$ $11B_1$, and $11B_2$ are inserted into the fixing ports, front ends of the pair of fixing portions $11A_1$, $11A_2$ ($11B_1$, $11B_2$) are bended inward so that the front ends approach to each other and inserted into the fixing ports.

After the front ends of the fixing portions $11A_1$, $11A_2$ ($11B_1$, $11B_2$) are inserted into the fixing ports, the front ends of the fixing portions $11A_1$, $11A_2$ ($11B_1$, $11B_2$) expand outward to each other, and the clicks 12 are locked to the inner side of the fixing ports. As a result, the lighting unit 20 can be fixed tightly and easily to the mounting side (place, device). In addition, the lighting unit 20 fixed to the required mounting portion is rotatably held by the holder members $6A_1$, $6A_2$, $6B_1$, and $6B_2$, which are rotatably engaged with the brackets 7A, 7B, around the axis connecting the holder members $6A_1$, $6A_2$ and the holder members $6B_1$, $6B_2$ as a rotation axis.

In the lighting unit 20, the board 2 and the reflector members 3A, 3B can be connected by engaging the engagement clicks 31a, 31b, 31c, 31d of the reflector members 3A, 3B with the engagement ports 25a, 25b, 25c, 25d disposed in the vicinity of the front edge 25 at both ends of the board 2. In addition, the bottom side of the board 2 is supported by the board support ribs 43a, 43b, 43c, 43d, 43e of the case member 4 and the engagement projected line portions 33A, 33B of the reflector members 3A, 3B are engaged with the engagement line groove portion 41 of the case member 4, and accordingly, the board 2, the reflector member 3 and the case member 4 can be mutually connected.

The board 2, the reflector members 3A, 3B and the case member 4 are mutually connected as described above, and the board holding ends 22a, 22b of the board 2 and the case holding ends 46a, 46b of the case members 4 are sandwiched by the holder members $6A_1$, $6A_2$ and the holder members $6B_1$, $6B_2$, which are the pair of top and bottom. In addition, the holder members $6A_1$, $6A_2$, $6B_1$, and $6B_2$ holding the board holding ends 22a, 22b and the case holding ends 46a, 46b are rotatably held by the brackets 7A, 7B, and as a result, the board 2, the reflector members 3A, 3B and the case member 4 are further tightly connected. In addition, the lower engagement portions 51A, 51B of the cover members 5A, 5B are engaged with the front edge 25 of the board 2, and the upper engagement portions 52A, 52B of the cover members 5A, 5B are engaged with the projected line portions 40a, 40b which are formed in the upper portion of the reflector members 3A, 3B, and accordingly, the board 2 and the front sides of the reflector members 3A, 3B are tightly connected via the cover members 5A, 5B.

Therefore, the connecting work or the fixing work of the board 2, reflector members 3A, 3B, case member 4, cover members 5A, 5B, holder members $6A_1$, $6A_2$, $6B_1$, and $6B_2$ and brackets 7A, 7B can be performed simply and easily by engaging/locking the mutual members through, for example, the engagement portions, engagement grooves and engagement projected lines without using a fixing member such as a screw. In addition, by mutually connecting each of the constituent members through engagement/locking between the mutual members, fixing strengths among the constituent members can be maintained for a long time after the assembling.

In addition, in the lighting unit of the present invention, the holder member and the bracket are not limited to the foregoing holder members $6A_1$, $6A_2$, $6B_1$, and $6B_2$ and the brackets 7A, 7B, and a member which has been commonly used as a fixing holder can be used as long as the member can hold and tightly connect the reflector members 3A, 3B and the case member 4. For example, a screw type fixing member mounted on the end of the board 2, the reflector members 3A, 3B and/or the case member 4 may be used.

<<Usage Example of Lighting Device and Model of Heat Dessipation from Board>>

Figure 14:
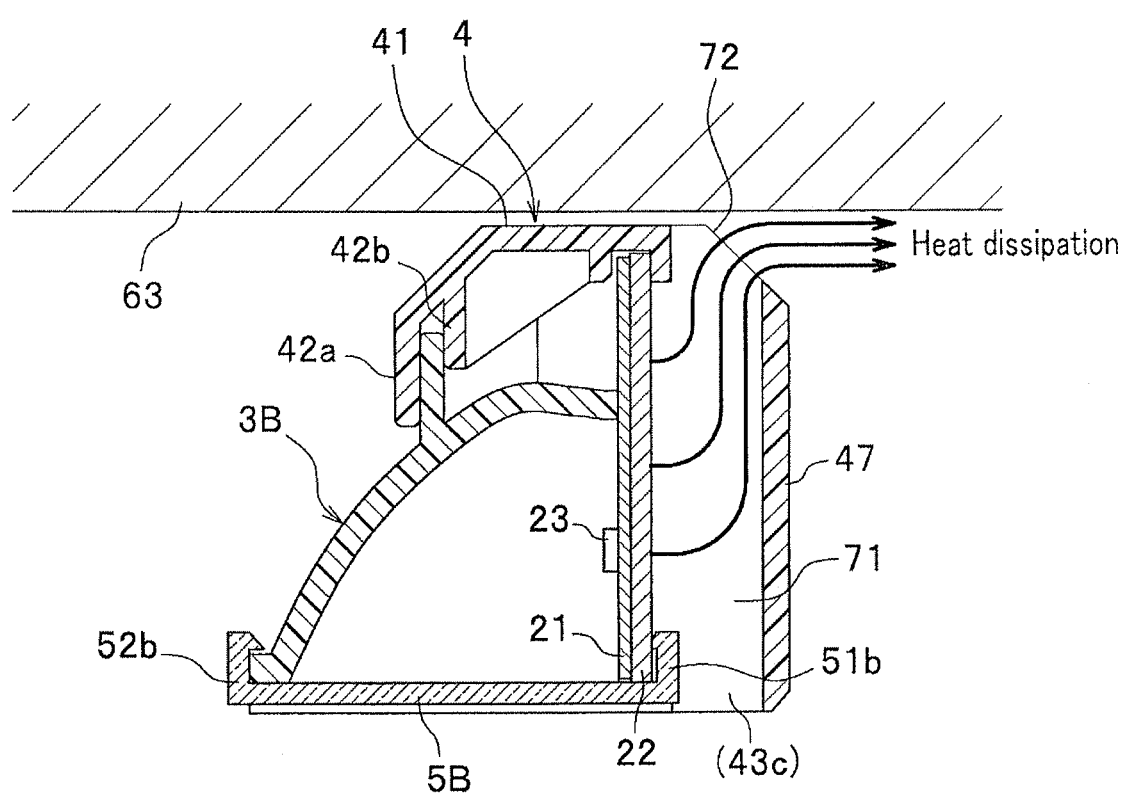
FIG. 14 is a view schematically showing heat dissipation from a lighting device.

A schematic perspective view of a showcase provided with a lighting device according to the present invention is shown in FIG. 13A. A view schematically showing a light distribution of an illumination light in the showcase is shown in FIG. 13B. In addition, a view schematically showing heat dissipation from a lighting device is shown in FIG. 14. A showcase 60 includes a plurality (four) of light transmissive display racks 61 and a display portion 62 disposed at the bottom portion. A plurality of lighting devices 1 are arranged inside the upper front end 63 of the showcase 60 along the longitudinal direction.

In the showcase 60, as shown in FIG. 13B, a light R output from the lighting device 1 which is fixed inside the upper front end 63 is distributed to the display racks 61 and the display portion 62. In the lighting device 1, an outgoing direction (that is, a direction to cover members 5A, 5B (not shown in FIG. 13A and FIG. 13B, see, for example, FIG. 1)) of a light can be adjusted and maintained arbitrarily by utilizing a frictional force which is generated between the brackets 7A, 7B and the holder members $6A_1$, $6A_2$, $6B_1$, and $6B_2$ around the axis connecting the holder members $6A_1$, $6A_2$ and the holder members $6B_1$, $6B_2$. If the outgoing direction of the light R is changed by rotating at a predetermined angle by, for example, taking the bottom plate portion 47 of the case member 4 and the upper engagement portions 52A, 52B by hand, and after that, if the hand is released at the predetermined angle, a desired light distribution can be easily obtained.

In this case, as shown in FIG. 14 (see FIG. 10 as appropriate), the bottom of the board 2 (heatsink board 22) is covered with the bottom plate portion 47 of the case member 4. Then, people are prevented from directly contacting the heated board 2, thereby resulting in securing the safety. In addition, the space portion 71 is formed between the board 2 and bottom plate portion 47, and the space portion 71 opens to both long sides of the board 2. Therefore, air warmed by the board 2 inside the space portion 71 is easily exhausted outside the space portion 71 through the lateral direction of the board 2 by natural convection. Therefore, a temperature rise of the board 2 can be suppressed. The board support ribs 43b, 43c, 43d are disposed in parallel with the lateral direction of the board 2. Then, the board support ribs 43b, 43c, 43d do not block the heat dissipation from the board 2, and can also increase the strength of the case member 4.

As shown in FIG. 14, when the lighting unit 20 is arranged close to and inside the upper front end 63, and if the opening face of the space portion 71 on the side of the upper front end 63 is close to the upper front end 63, it is preferable that an opening face of the case member 4 on the side of the upper front end 63 has a taper opening face 72 where the space portion 71 largely opens to the side of the bottom plate portion 47 so that the heat is not kept inside the space portion 71. Namely, on the side opposite to a lighting direction (that is, a reflection direction of a light by the reflector members 3A, 3B) of the lighting unit 20, an edge of the bottom plate portion 47 along the long side is located on the side of the lighting direction of the lighting unit 20 in comparison with the edge of the board 2 along the long side thereof. Therefore, in addition to the lateral direction of the board 2, a heat dissipation path to a direction facing the board 2 can also be secured. Accordingly, a generation of deflection of the board 2 due to excessive temperature rise and a generation of misalignment of the optical axis for collecting a light by the reflector members 3A, 3B due to the generation of deflection of the board 2 can be prevented.

The lighting device 1 is not always disposed in such a manner that the longitudinal direction of the lighting device 1 is in the horizontal direction as shown in FIG. 13A and FIG. 13B. Therefore, it is preferable that shapes of the board support ribs 43b, 43c, 43d disposed in the case member 4 are changed depending on a position and environment where the lighting device 1 is installed. A schematic perspective view of another case member used for a lighting unit is shown in FIG. 15A, and a schematic perspective view of still another case member used for a lighting unit is shown in FIG. 15B.

Figure 15A:
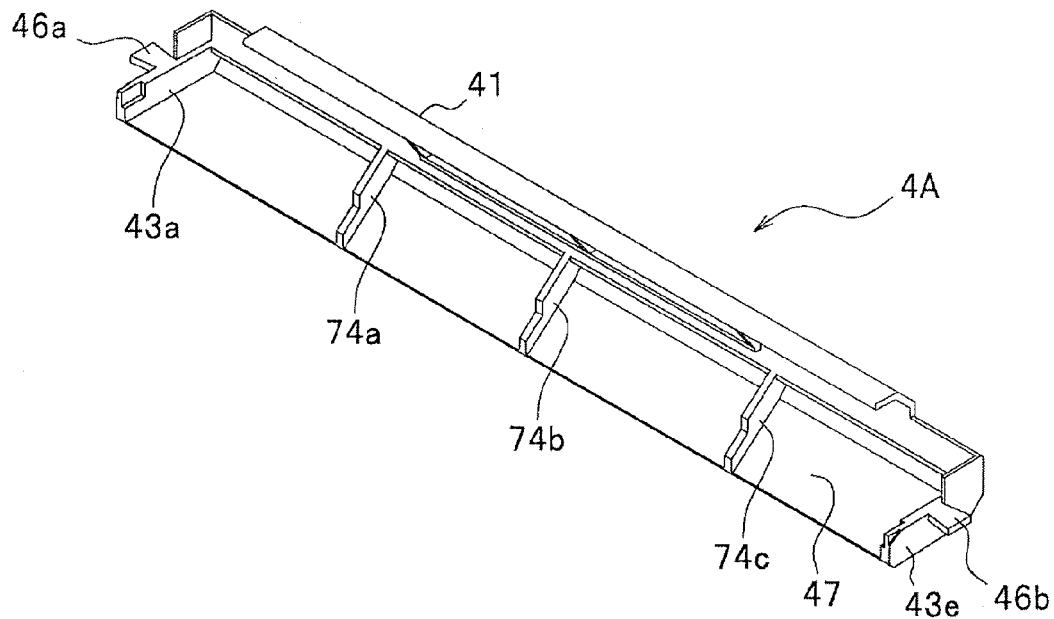
FIG. 15A is a schematic perspective view of another case member used for a lighting unit.
Figure 15B:
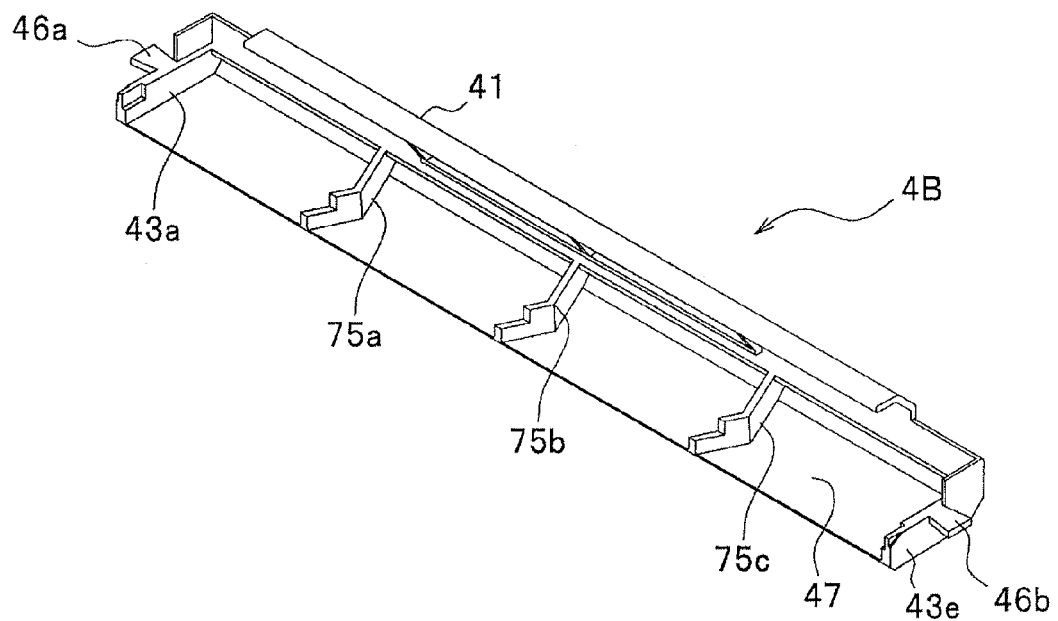
FIG. 15B is a schematic perspective view of still another case member used for a lighting unit.

As shown in FIG. 15A, a case member 4A includes board support ribs 74a, 74b, 74c extending to a direction intersecting with the lateral direction of the bottom plate portion 47 at a constant angle, instead of the board support ribs 43b, 43c, 43d of the case member 4. As shown in FIG. 15B, a case member 4B includes board support ribs 75a, 75b, 75c having a V-shape which intersects with the lateral direction of the bottom plate portion 47 at a constant angle, instead of the board support ribs 43b, 43c, 43d of the case member 4.

A lighting unit provided with the case members 4A, 4B is preferably used in the case that lighting unit is arranged in such a manner that the case holding portion 46a is located at an upper side in the vertical direction and the case holding portion 46b is located at lower side in the vertical direction, so that air warmed by the board 2 goes up along the board support ribs 74a, 74b, 74c, 75a, 75b, 75c, and is exhausted outside the lighting unit 20. As described above, a distance that the air warmed by the board 2 (not shown in FIG. 15A and FIG. 15B) goes up along the longitudinal direction of the board 2 is shortened, and accordingly, a heat dissipation of the board 2 can be increased.

The embodiment of the present invention has been explained. However, the present invention is not limited to the foregoing embodiment. For example, the board support ribs supporting the board 2 are not always disposed in the case member 4, and a structure having heat dissipation fins which are erected at the bottom of the heatsink board 22 and in contact with the bottom plate portion 47 of the case member 4 as the board support ribs, may also be adopted. A heat dissipation area is increased by the heat dissipation fins, and the heat dissipation is further improved. In addition, for dealing with the case that the arrangement of the lighting unit 20 is unknown, that is, when it is unknown whether the longitudinal direction of the lighting unit 20 is in the horizontal direction or in the vertical direction, for example, a louver structure that can arbitrarily adjust the longitudinal direction of the board support rib against the lateral direction of the bottom plate portion 47 may also be adopted.

In addition, application of the lighting device 1 according to the present invention is not limited to a showcase, but may also be used for, for example, various kinds of direct and indirect lighting of interior and exterior use, and illumination for outdoor advertising display.

What is clamied is:

1. A support, comprising:
a bracket fixed to a predetermined structure; and
a holder locked to the bracket and having substantially a columnar shape,
wherein the bracket has a receiving hole for housing the holder;
wherein the holder has a first rib erected at a curved outer circumferential surface and an elastic portion which gives a freedom of motions to the first rib in substantially a radial direction,
wherein the first rib is pushed to an inner circumferential surface of the receiving hole by the elastic portion, and the holder is rotatable and lockable against the bracket by utilizing a frictional force to be generated between the first rib and the inner circumferential surface of the receiving hole.

2. The support according to claim 1,
wherein the first rib is disposed at least four places of two pairs which are substantially point symmetric with respect to a radial direction of the holder.

3. The support according to claim 1,
wherein the receiving hole has a structure where a bottom diameter is smaller than an opening diameter and a protrusion is formed at a predetermined position on the inner circumferential surface which is formed in a conical shape; and
wherein the holder includes an annular groove formed in a circumferential direction at a central portion in the longitudinal direction on the curved outer circumferential surface, a first annular protrusion constituting one side wall of the annular groove and provided with a recess through which the protrusion can pass, and a second annular protrusion constituting the other side wall of the annular groove,
wherein when the holder is locked in the bracket, a frictional force is generated between a wall surface of the first annular protrusion on the side of the annular groove and the protrusion by utilizing a force that the first rib receives from the inner circumferential surface of the receiving hole in a direction pushing out the holder from the receiving hole.

4. The support according to claim 3, further comprising a second rib erected on the wall surface of the first annular protrusion on the side of the annular groove.

5. The support according to claim 1,
wherein the holder consists of two members having substantially half-columnar shapes identical to each other.

6. A lighting device, comprising:
a bracket fixed to a predetermined structure; and
a holder locked to the bracket and having substantially a columnar shape; wherein,
the bracket has a receiving hole for housing the holder;
the holder has a first rib erected at a curved outer circumferential surface and an elastic portion which gives a freedom of motions to the first rib in substantially a radial direction;

the first rib is pushed to an inner circumferential surface of the receiving hole by the elastic portion, and the holder is rotatable and lockable against the bracket by utilizing a frictional force to be generated between the first rib and the inner circumferential surface of the receiving hole;

the receiving hole has a structure where a bottom diameter is smaller than an opening diameter and a protrusion is formed at a predetermined position on the inner circumferential surface which is formed in a conical shape;

the holder includes an annular groove formed in a circumferential direction at a central portion in the longitudinal direction on the curved outer circumferential surface, a first annular protrusion constituting one side wall of the annular groove and provided with a recess through which the protrusion can pass, and a second annular protrusion constituting the other side wall of the annular groove;

when the holder is locked in the bracket, a frictional force is generated between a wall surface of the first annular protrusion on the side of the annular groove and the protrusion by utilizing a force that the first rib receives from the inner circumferential surface of the receiving hole in a direction pushing out the holder from the receiving hole;

a second rib is erected on the wall surface of the first annular protrusion on the side of the annular groove;

the holder consists of two members having substantially half-columnar shapes identical to each other;

a board on which a light emitting portion having a semiconductor light emitting device is arrayed on an upper side along the longitudinal direction;

a reflector is disposed on the upper side of the board and has a reflection portion inside the reflector for reflecting a light from the light emitting portion, as well as covering the light emitting portion; and a case is disposed so as to support the board and the reflector from the top and the bottom.

7. The support according to claim 1, wherein the first rib is enclosed within the bracket.

* * * * *